(12) United States Patent
Belur Sowmya Keshava et al.

(10) Patent No.: US 12,626,486 B2
(45) Date of Patent: May 12, 2026

(54) STAR TRAILS IMAGE PROCESSING

(71) Applicant: GoPro, Inc., San Mateo, CA (US)

(72) Inventors: Anantha Keshava Belur Sowmya Keshava, San Ramon, CA (US); Ojas Gandhi, San Ramon, CA (US); Austin Whitfield-Hill, San Jose, CA (US)

(73) Assignee: GoPro, Inc., San Mateo, CA (US)

( * ) Notice: Subject to any disclaimer, the term of this patent is extended or adjusted under 35 U.S.C. 154(b) by 605 days.

(21) Appl. No.: 18/142,753

(22) Filed: May 3, 2023

(65) Prior Publication Data

US 2024/0371131 A1     Nov. 7, 2024

(51) Int. Cl.
| | |
|---|---|
| *G06V 10/764* | (2022.01) |
| *H04N 5/52* | (2006.01) |
| *H04N 9/31* | (2006.01) |
| *H04N 23/73* | (2023.01) |

(52) U.S. Cl.
CPC ............. *G06V 10/764* (2022.01); *H04N 5/52* (2013.01); *H04N 9/3182* (2013.01); *H04N 23/73* (2023.01)

(58) Field of Classification Search
CPC ...... G06V 10/764; H04N 5/52; H04N 9/3182; H04N 23/73; H04N 23/667; H04N 23/71; H04N 23/74; H04N 23/11; H04N 23/6812; H04N 23/55; H04N 23/61; H04N 23/72; H04N 23/20; H04N 23/62; G06T 2207/20221; G06T 5/50
See application file for complete search history.

(56) References Cited

U.S. PATENT DOCUMENTS

| | | | | |
|---|---|---|---|---|
| 7,598,995 B2* | 10/2009 | Yamaya | ............... | H04N 23/631 348/333.01 |
| 9,386,230 B1* | 7/2016 | Duran | .................... | H04N 23/60 |
| 11,039,079 B1* | 6/2021 | Sandofsky | ............. | H04N 23/73 |
| 11,394,900 B1* | 7/2022 | Sandofsky | ........... | H04N 5/2625 |
| 11,516,402 B1* | 11/2022 | Sandofsky | .............. | G06T 3/147 |
| 11,696,024 B2* | 7/2023 | Calvert | .................. | H04N 23/62 348/220.1 |
| 2005/0220341 A1* | 10/2005 | Akahori | ............... | G06V 10/443 382/190 |
| 2007/0025718 A1* | 2/2007 | Mori | ....................... | H04N 23/74 348/E3.02 |
| 2011/0157425 A1* | 6/2011 | Nakayama | ............. | H04N 23/71 348/234 |
| 2012/0070084 A1* | 3/2012 | Yu | ............................. | G06T 5/92 382/190 |
| 2014/0125833 A1* | 5/2014 | Sudo | .................... | H04N 23/632 348/222.1 |

(Continued)

*Primary Examiner* — Michael S Osinski
(74) *Attorney, Agent, or Firm* — Young Basile Hanlon & MacFarlane, P.C.

(57) ABSTRACT

An image signal processor accesses raw images from an image sensor. The image signal processor obtains adaptive acquisition control data for the raw images. The adaptive acquisition control data comprises at least one of a luminance value, a contrast value, a gain value, an exposure value, or a white balance value. The image signal processor obtains, in accordance with the adaptive acquisition control data, an indication of whether to use a star trails scene classification for the raw images. The image signal processor transmits, to buffers for storing data in accordance with the raw images, the indication of whether to use the star trails scene classification.

20 Claims, 9 Drawing Sheets

(56)                    References Cited

U.S. PATENT DOCUMENTS

| | | | |
|---|---|---|---|
| 2015/0130828 A1* | 5/2015 | Watanabe | G09G 5/10 |
| | | | 345/589 |
| 2015/0189180 A1* | 7/2015 | Sudo | H04N 23/634 |
| | | | 348/222.1 |
| 2015/0334291 A1* | 11/2015 | Cho | G06F 3/04883 |
| | | | 348/222.1 |
| 2016/0284095 A1* | 9/2016 | Chalom | G06F 18/2413 |
| 2018/0367744 A1* | 12/2018 | Ozone | H04N 25/131 |
| 2019/0297277 A1* | 9/2019 | Gignac | H04N 23/741 |
| 2019/0364187 A1* | 11/2019 | Kawasaki | H04N 23/11 |
| 2020/0068112 A1* | 2/2020 | Zhang | H04N 23/681 |
| 2020/0068121 A1* | 2/2020 | Wang | G06T 5/50 |
| 2021/0195108 A1* | 6/2021 | Wang | H04N 23/73 |
| 2022/0060624 A1* | 2/2022 | Calvert | H04N 23/667 |
| 2022/0182525 A1* | 6/2022 | Lv | G06T 7/90 |
| 2022/0191378 A1* | 6/2022 | Kawamoto | H04N 23/667 |
| 2022/0223017 A1* | 7/2022 | Wong | H04N 23/80 |
| 2023/0067332 A1* | 3/2023 | Hirayama | H04N 23/71 |
| 2023/0254598 A1* | 8/2023 | Thuresson | H04N 23/71 |
| | | | 348/164 |
| 2024/0187744 A1* | 6/2024 | Cui | H04N 23/71 |

* cited by examiner

900

902
ACCESS RAW IMAGES FROM AN IMAGE SENSOR

904
OBTAIN ADAPTIVE ACQUISITION CONTROL DATA FOR THE RAW IMAGES

906
OBTAIN AN INDICATION OF WHETHER TO USE A STAR TRAILS SCENE CLASSIFICATION FOR THE RAW IMAGES

908
TRANSMIT THE INDICATION OF WHETHER TO USE THE STAR TRAILS SCENE CLASSIFICATION

STAR TRAILS IMAGE PROCESSING

TECHNICAL FIELD

This disclosure relates to image processing. Some implementations relate to image processing by an image signal processor to generate star trails imagery.

BACKGROUND

Star trails imagery includes an image file and a video file (e.g., a time lapse video file) depicting a circular path of stars in the night sky relative to a fixed observation point on or close (e.g., within 100 meters) to the Earth's surface. Generating star trials imagery may be desirable to capture the beauty of the night sky and the movement (relative to a point on or close to the Earth's surface) thereof. To generate star trails imagery, a user typically sets up a camera in the evening (e.g., within two hours before or after the sunset) and leaves the camera in place until the morning (e.g., within two hours before or after the sunrise).

SUMMARY

Disclosed herein are implementations of star trails image processing.

A method includes accessing, by an image signal processor, raw images from an image sensor. The method includes obtaining, by the image signal processor, adaptive acquisition control data for the raw images, the adaptive acquisition control data comprising at least one of a luminance value, a contrast value, a gain value, an exposure value, or a white balance value. The method includes obtaining, in accordance with the adaptive acquisition control data, an indication of whether to use a star trails scene classification for the raw images. The method includes transmitting, by the image signal processor to buffers for storing data in accordance with the raw images, the indication of whether to use the star trails scene classification.

An apparatus includes a storage unit, an image sensor, and an image signal processor. The image signal processor accesses raw images from the image sensor. The image signal processor obtains adaptive acquisition control data for the raw images, the adaptive acquisition control data comprising at least one of a luminance value, a contrast value, a gain value, an exposure value, or a white balance value. The image signal processor obtains, in accordance with the adaptive acquisition control data, an indication of whether to use a star trails scene classification for the raw images. The image signal processor transmits, to buffers for storing data in accordance with the raw images, the indication of whether to use the star trails scene classification.

A machine readable medium stores instructions. The instructions, when executed by an image signal processor, cause the image signal processor to access raw images from an image sensor. The instructions, when executed by an image signal processor, cause the image signal processor to obtain adaptive acquisition control data for the raw images, the adaptive acquisition control data comprising at least one of a luminance value, a contrast value, a gain value, an exposure value, or a white balance value. The instructions, when executed by an image signal processor, cause the image signal processor to obtain, in accordance with the adaptive acquisition control data, an indication of whether to use a star trails scene classification for the raw images. The instructions, when executed by an image signal processor, cause the image signal processor to transmit, to buffers for storing data in accordance with the raw images, the indication of whether to use the star trails scene classification.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

As described above, star trails imagery includes an image file and a video file (e.g., comprising a time lapse video) depicting a circular path of stars in the night sky relative to a fixed observation point on or close (e.g., within 100 meters) to the Earth's surface. To generate star trails imagery, a user typically sets up a camera in the evening (e.g., within two hours before or after the sunset) and leaves the camera in place until the morning (e.g., within two hours before or after the sunrise). This may result in the star trails imagery including images taken during different environmental (e.g., lighting) conditions, which may be optimized with very different adaptive acquisition control data settings associated with the camera lens. Techniques for automatically obtaining star trails imagery which take into account the different environmental conditions in which this imagery is obtained may be desirable.

Some implementations are performed using an image signal processor (ISP) of a camera during capture of star trails imagery. The capture of the star trails imagery may begin before sunset and end after sunrise. The ISP accesses raw images from an image sensor. The ISP obtains adaptive acquisition control data for the raw images. The adaptive acquisition control data may include at least one of a luminance value, a contrast value, a gain value, an exposure value, or a white balance value. The ISP obtains, in accordance with the adaptive acquisition control data, an indication of whether to use a star trails scene classification (e.g., as opposed to a daytime scene classification) for the raw images. For example, the ISP may determine an image luminance of a processed image corresponding to a raw image and determine to use the star trails scene classification if the image luminance value exceeds (or falls below) a threshold. The ISP transmits, to buffers for storing data in accordance with the raw images, the indication of whether to use the star trails scene classification. The star trails scene classification may include at least one of a wider aperture value, a longer exposure value, or a higher gain value relative to a daytime scene classification.

In some cases, the ISP obtains image acquisition parameters in accordance with the indication of whether to use the star trails scene classification (e.g., as opposed to the daytime scene classification). The image acquisition parameters may include at least one of an aperture value, an exposure value, or a gain value.

In some cases, the ISP operates in conjunction with a sensor readout (SRO) component. The SRO component converts the raw images to partially processed image data and sends the partially processed image data to the buffers. The buffers may store partially processed image data including RGB images or YUV images.

Figure 1A:
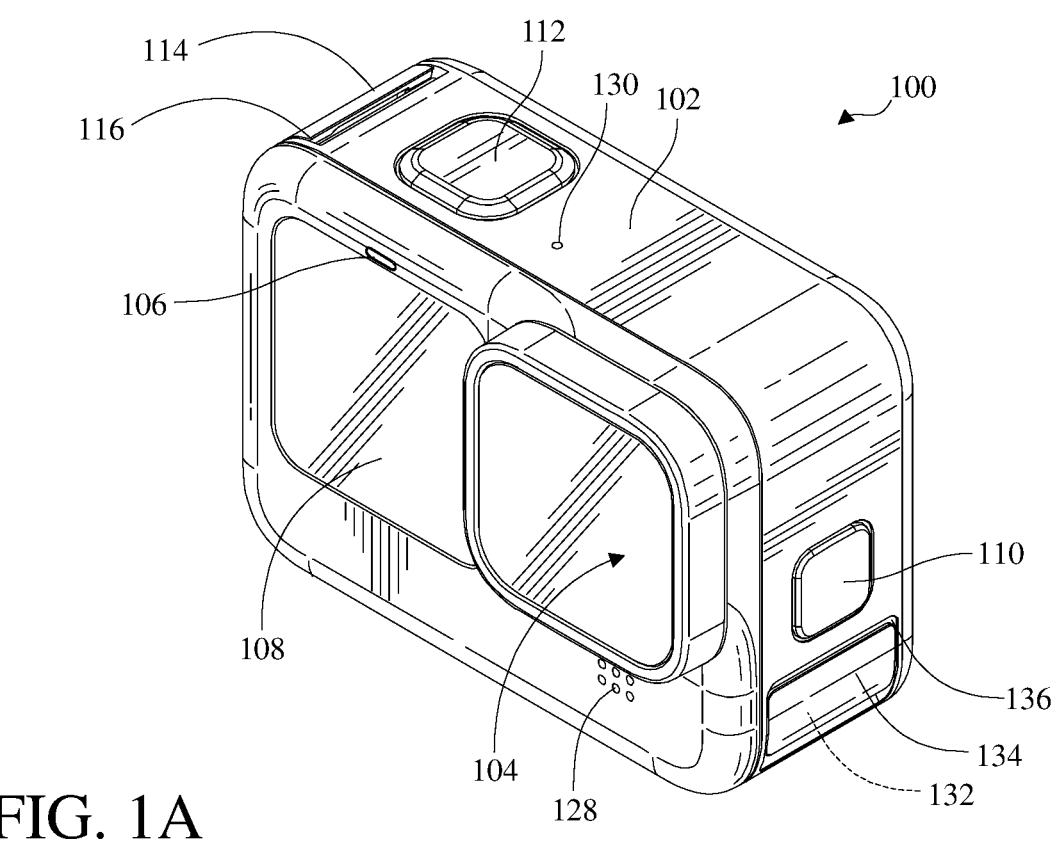
FIGS. 1A-B are isometric views of an example of an image capture apparatus.
Figure 1B:
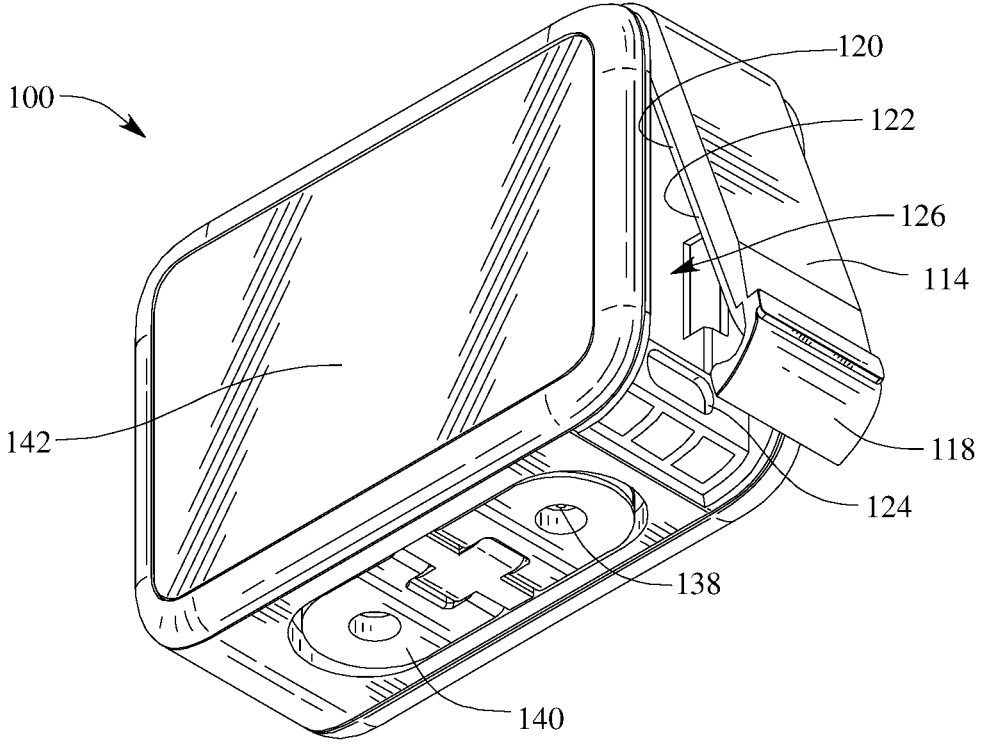
Figure 5:
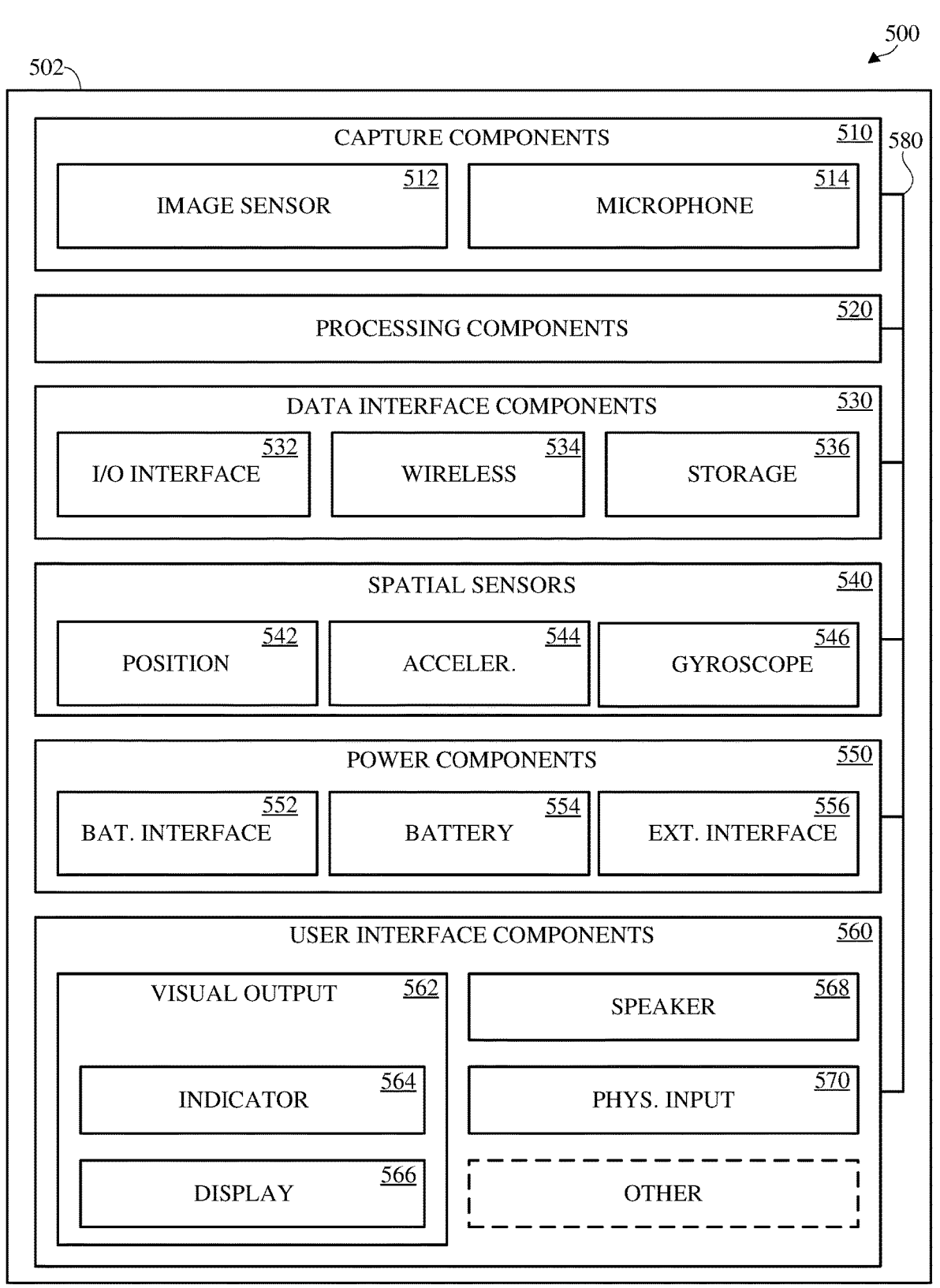
FIG. 5 is a block diagram of electronic components of an image capture apparatus.

FIGS. 1A-B are isometric views of an example of an image capture apparatus 100. The image capture apparatus 100 includes a body 102, an image capture device 104, an indicator 106, a display 108, a mode button 110, a shutter button 112, a door 114, a hinge mechanism 116, a latch mechanism 118, a seal 120, a battery interface 122, a data interface 124, a battery receptacle 126, microphones 128, 130, 132, a speaker 138, an interconnect mechanism 140, and a display 142. Although not expressly shown in FIGS. 1A-B, the image capture apparatus 100 includes internal electronics, such as imaging electronics, power electronics, and the like, internal to the body 102 for capturing images and performing other functions of the image capture apparatus 100. An example showing internal electronics is shown in FIG. 5. The arrangement of the components of the image capture apparatus 100 shown in FIGS. 1A-B is an example, other arrangements of elements may be used, except as is described herein or as is otherwise clear from context.

The body 102 of the image capture apparatus 100 may be made of a rigid material such as plastic, aluminum, steel, or fiberglass. Other materials may be used. The image capture device 104 is structured on a front surface of, and within, the body 102. The image capture device 104 includes a lens. The lens of the image capture device 104 receives light incident upon the lens of the image capture device 104 and directs the received light onto an image sensor of the image capture device 104 internal to the body 102. The image capture apparatus 100 may capture one or more images, such as a sequence of images, such as video. The image capture apparatus 100 may store the captured images and video for subsequent display, playback, or transfer to an external device. Although one image capture device 104 is shown in FIG. 1A, the image capture apparatus 100 may include multiple image capture devices, which may be structured on respective surfaces of the body 102.

As shown in FIG. 1A, the image capture apparatus 100 includes the indicator 106 structured on the front surface of the body 102. The indicator 106 may output, or emit, visible light, such as to indicate a status of the image capture apparatus 100. For example, the indicator 106 may be a light-emitting diode (LED). Although one indicator 106 is shown in FIG. 1A, the image capture apparatus 100 may include multiple indictors structured on respective surfaces of the body 102.

As shown in FIG. 1A, the image capture apparatus 100 includes the display 108 structured on the front surface of the body 102. The display 108 outputs, such as presents or displays, such as by emitting visible light, information, such as to show image information such as image previews, live video capture, or status information such as battery life, camera mode, elapsed time, and the like. In some implementations, the display 108 may be an interactive display, which may receive, detect, or capture input, such as user input representing user interaction with the image capture apparatus 100. In some implementations, the display 108 may be omitted or combined with another component of the image capture apparatus 100.

As shown in FIG. 1A, the image capture apparatus 100 includes the mode button 110 structured on a side surface of the body 102. Although described as a button, the mode button 110 may be another type of input device, such as a switch, a toggle, a slider, or a dial. Although one mode button 110 is shown in FIG. 1A, the image capture apparatus 100 may include multiple mode, or configuration, buttons structured on respective surfaces of the body 102. In some implementations, the mode button 110 may be omitted or combined with another component of the image capture apparatus 100. For example, the display 108 may be an interactive, such as touchscreen, display, and the mode button 110 may be physically omitted and functionally combined with the display 108.

As shown in FIG. 1A, the image capture apparatus 100 includes the shutter button 112 structured on a top surface of the body 102. The shutter button 112 may be another type of input device, such as a switch, a toggle, a slider, or a dial. The image capture apparatus 100 may include multiple shutter buttons structured on respective surfaces of the body 102. In some implementations, the shutter button 112 may be omitted or combined with another component of the image capture apparatus 100.

The mode button 110, the shutter button 112, or both, obtain input data, such as user input data in accordance with user interaction with the image capture apparatus 100. For example, the mode button 110, the shutter button 112, or both, may be used to turn the image capture apparatus 100 on and off, scroll through modes and settings, and select modes and change settings.

As shown in FIG. 1B, the image capture apparatus 100 includes the door 114 coupled to the body 102, such as using the hinge mechanism 116 (FIG. 1A). The door 114 may be secured to the body 102 using the latch mechanism 118 that releasably engages the body 102 at a position generally opposite the hinge mechanism 116. The door 114 includes the seal 120 and the battery interface 122. Although one door 114 is shown in FIG. 1A, the image capture apparatus 100 may include multiple doors respectively forming respective surfaces of the body 102, or portions thereof. The door 114 may be removable from the body 102 by releasing the latch mechanism 118 from the body 102 and decoupling the hinge mechanism 116 from the body 102.

In FIG. 1B, the door 114 is shown in a partially open position such that the data interface 124 is accessible for communicating with external devices and the battery receptacle 126 is accessible for placement or replacement of a battery. In FIG. 1A, the door 114 is shown in a closed position. In implementations in which the door 114 is in the closed position, the seal 120 engages a flange (not shown) to provide an environmental seal and the battery interface 122 engages the battery (not shown) to secure the battery in the battery receptacle 126.

As shown in FIG. 1B, the image capture apparatus 100 includes the battery receptacle 126 structured to form a portion of an interior surface of the body 102. The battery receptacle 126 includes operative connections for power transfer between the battery and the image capture apparatus 100. In some implementations, the battery receptacle 126 may be omitted. The image capture apparatus 100 may include multiple battery receptacles.

As shown in FIG. 1A, the image capture apparatus 100 includes a first microphone 128 structured on a front surface of the body 102, a second microphone 130 structured on a top surface of the body 102, and a third microphone 132 structured on a side surface of the body 102. The third microphone 132, which may be referred to as a drain microphone and is indicated as hidden in dotted line, is located behind a drain cover 134, surrounded by a drain channel 136, and can drain liquid from audio components of the image capture apparatus 100. The image capture apparatus 100 may include other microphones on other surfaces of the body 102. The microphones 128, 130, 132 receive and record audio, such as in conjunction with capturing video or separate from capturing video. In some implementations, one or more of the microphones 128, 130, 132 may be omitted or combined with other components of the image capture apparatus 100.

As shown in FIG. 1B, the image capture apparatus 100 includes the speaker 138 structured on a bottom surface of the body 102. The speaker 138 outputs or presents audio, such as by playing back recorded audio or emitting sounds associated with notifications. The image capture apparatus 100 may include multiple speakers structured on respective surfaces of the body 102.

As shown in FIG. 1B, the image capture apparatus 100 includes the interconnect mechanism 140 structured on a bottom surface of the body 102. The interconnect mechanism 140 removably connects the image capture apparatus 100 to an external structure, such as a handle grip, another mount, or a securing device. The interconnect mechanism 140 includes folding protrusions configured to move between a nested or collapsed position as shown in FIG. 1B and an extended or open position. The folding protrusions of the interconnect mechanism 140 in the extended or open position may be coupled to reciprocal protrusions of other devices such as handle grips, mounts, clips, or like devices. The image capture apparatus 100 may include multiple interconnect mechanisms structured on, or forming a portion of, respective surfaces of the body 102. In some implementations, the interconnect mechanism 140 may be omitted.

As shown in FIG. 1B, the image capture apparatus 100 includes the display 142 structured on, and forming a portion of, a rear surface of the body 102. The display 142 outputs, such as presents or displays, such as by emitting visible light, data, such as to show image information such as image previews, live video capture, or status information such as battery life, camera mode, elapsed time, and the like. In some implementations, the display 142 may be an interactive display, which may receive, detect, or capture input, such as user input representing user interaction with the image capture apparatus 100. The image capture apparatus 100 may include multiple displays structured on respective surfaces of the body 102, such as the displays 108, 142 shown in FIGS. 1A-1B. In some implementations, the display 142 may be omitted or combined with another component of the image capture apparatus 100.

The image capture apparatus 100 may include features or components other than those described herein, such as other buttons or interface features. In some implementations, interchangeable lenses, cold shoes, and hot shoes, or a combination thereof, may be coupled to or combined with the image capture apparatus 100. For example, the image capture apparatus 100 may communicate with an external device, such as an external user interface device, via a wired or wireless computing communication link, such as via the data interface 124. The computing communication link may be a direct computing communication link or an indirect computing communication link, such as a link including another device or a network, such as the Internet. The image capture apparatus 100 may transmit images to the external device via the computing communication link.

The external device may store, process, display, or combination thereof, the images. The external user interface device may be a computing device, such as a smartphone, a tablet computer, a smart watch, a portable computer, personal computing device, or another device or combination of devices configured to receive user input, communicate information with the image capture apparatus 100 via the computing communication link, or receive user input and communicate information with the image capture apparatus 100 via the computing communication link. The external user interface device may implement or execute one or more applications to manage or control the image capture apparatus 100. For example, the external user interface device may include an application for controlling camera configuration, video acquisition, video display, or any other configurable or controllable aspect of the image capture apparatus 100. In some implementations, the external user interface device may generate and share, such as via a cloud-based or social media service, one or more images or video clips. In some implementations, the external user interface device may display unprocessed or minimally processed images or video captured by the image capture apparatus 100 contemporaneously with capturing the images or video by the image capture apparatus 100, such as for shot framing or live preview.

Figure 2A:
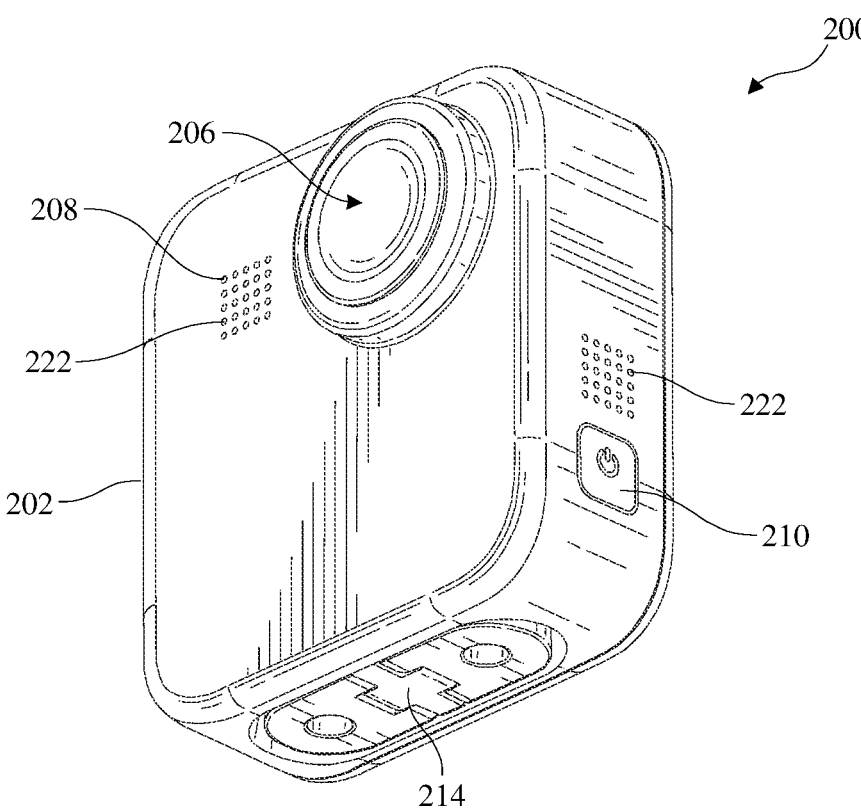
FIGS. 2A-B are isometric views of another example of an image capture apparatus.
Figure 2B:
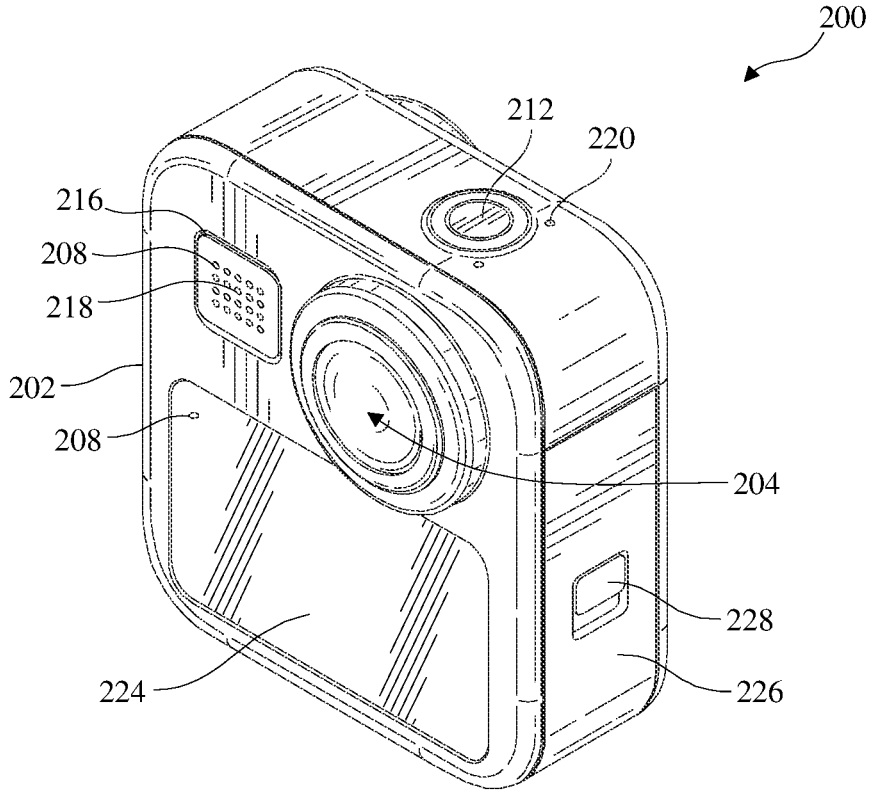

FIGS. 2A-2B illustrate another example of an image capture apparatus 200. The image capture apparatus 200 is similar to the image capture apparatus 100 shown in FIGS. 1A-1B. The image capture apparatus 200 includes a body 202, a first image capture device 204, a second image capture device 206, indicators 208, a mode button 210, a shutter button 212, an interconnect mechanism 214, a drainage channel 216, audio components 218, 220, 222, a display 224, and a door 226 including a release mechanism 228. The arrangement of the components of the image capture apparatus 200 shown in FIGS. 2A-2B is an example, other arrangements of elements may be used.

The body 202 of the image capture apparatus 200 may be similar to the body 102 shown in FIGS. 1A-1B. The first image capture device 204 is structured on a front surface of the body 202. The first image capture device 204 includes a first lens. The first image capture device 204 may be similar to the image capture device 104 shown in FIG. 1A. As shown in FIG. 2A, the image capture apparatus 200 includes the second image capture device 206 structured on a rear surface of the body 202. The second image capture device 206 includes a second lens. The second image capture device 206 may be similar to the image capture device 104 shown in FIG. 1A. The image capture devices 204, 206 are disposed on opposing surfaces of the body 202, for example, in a back-to-back configuration, Janus configuration, or offset Janus configuration. The image capture apparatus 200 may include other image capture devices structured on respective surfaces of the body 202.

As shown in FIG. 2B, the image capture apparatus 200 includes the indicators 208 associated with the audio component 218 and the display 224 on the front surface of the body 202. The indicators 208 may be similar to the indicator 106 shown in FIG. 1A. For example, one of the indicators 208 may indicate a status of the first image capture device 204 and another one of the indicators 208 may indicate a status of the second image capture device 206. Although two indicators 208 are shown in FIGS. 2A-2B, the image capture apparatus 200 may include other indictors structured on respective surfaces of the body 202.

As shown in FIGS. 2A-B, the image capture apparatus 200 includes input mechanisms including the mode button 210, structured on a side surface of the body 202, and the shutter button 212, structured on a top surface of the body 202. The mode button 210 may be similar to the mode button 110 shown in FIG. 1B. The shutter button 212 may be similar to the shutter button 112 shown in FIG. 1A.

The image capture apparatus 200 includes internal electronics (not expressly shown), such as imaging electronics, power electronics, and the like, internal to the body 202 for capturing images and performing other functions of the image capture apparatus 200. An example showing internal electronics is shown in FIG. 5.

As shown in FIGS. 2A-2B, the image capture apparatus 200 includes the interconnect mechanism 214 structured on a bottom surface of the body 202. The interconnect mechanism 214 may be similar to the interconnect mechanism 140 shown in FIG. 1B.

As shown in FIG. 2B, the image capture apparatus 200 includes the drainage channel 216 for draining liquid from audio components of the image capture apparatus 200.

As shown in FIGS. 2A-2B, the image capture apparatus 200 includes the audio components 218, 220, 222, respectively structured on respective surfaces of the body 202. The audio components 218, 220, 222 may be similar to the microphones 128, 130, 132 and the speaker 138 shown in FIGS. 1A-1B. One or more of the audio components 218, 220, 222 may be, or may include, audio sensors, such as microphones, to receive and record audio signals, such as voice commands or other audio, in conjunction with capturing images or video. One or more of the audio components 218, 220, 222 may be, or may include, an audio presentation component that may present, or play, audio, such as to provide notifications or alerts.

As shown in FIGS. 2A-2B, a first audio component 218 is located on a front surface of the body 202, a second audio component 220 is located on a top surface of the body 202, and a third audio component 222 is located on a back surface of the body 202. Other numbers and configurations for the audio components 218, 220, 222 may be used. For example, the audio component 218 may be a drain microphone surrounded by the drainage channel 216 and adjacent to one of the indicators 208 as shown in FIG. 2B.

As shown in FIG. 2B, the image capture apparatus 200 includes the display 224 structured on a front surface of the body 202. The display 224 may be similar to the displays 108, 142 shown in FIGS. 1A-1B. The display 224 may include an I/O interface. The display 224 may include one or more of the indicators 208. The display 224 may receive touch inputs. The display 224 may display image information during video capture. The display 224 may provide status information to a user, such as status information indicating battery power level, memory card capacity, time elapsed for a recorded video, etc. The image capture apparatus 200 may include multiple displays structured on respective surfaces of the body 202. In some implementations, the display 224 may be omitted or combined with another component of the image capture apparatus 200.

As shown in FIG. 2B, the image capture apparatus 200 includes the door 226 structured on, or forming a portion of, the side surface of the body 202. The door 226 may be similar to the door 114 shown in FIG. 1A. For example, door 226 shown in FIG. 2A includes a release mechanism 228. The release mechanism 228 may include a latch, a button, or other mechanism configured to receive a user input that allows the door 226 to change position. The release mechanism 228 may be used to open the door 226 for a user to access a battery, a battery receptacle, an I/O interface, a memory card interface, etc.

In some embodiments, the image capture apparatus 200 may include features or components other than those described herein, some features or components described herein may be omitted, or some features or components described herein may be combined. For example, the image capture apparatus 200 may include additional interfaces or different interface features, interchangeable lenses, cold shoes, or hot shoes.

Figure 3:
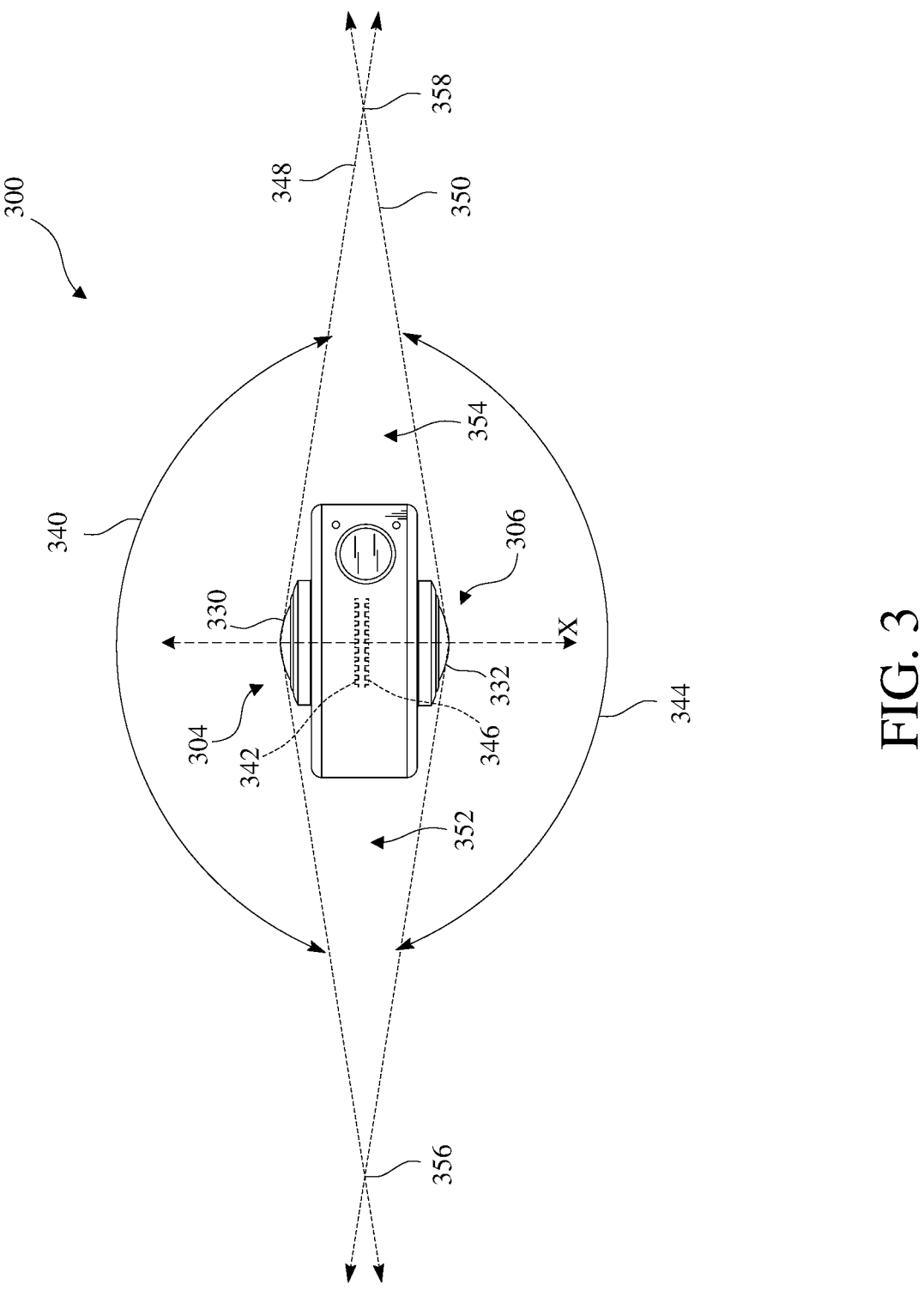
FIG. 3 is a top view of another example of an image capture apparatus.

FIG. 3 is a top view of an image capture apparatus 300. The image capture apparatus 300 is similar to the image capture apparatus 200 of FIGS. 2A-2B and is configured to capture spherical images.

As shown in FIG. 3, a first image capture device 304 includes a first lens 330 and a second image capture device 306 includes a second lens 332. For example, the first image capture device 304 may capture a first image, such as a first hemispheric, or hyper-hemispherical, image, the second image capture device 306 may capture a second image, such as a second hemispheric, or hyper-hemispherical, image, and the image capture apparatus 300 may generate a spherical image incorporating or combining the first image and the second image, which may be captured concurrently, or substantially concurrently.

The first image capture device 304 defines a first field-of-view 340 wherein the first lens 330 of the first image capture device 304 receives light. The first lens 330 directs the received light corresponding to the first field-of-view 340 onto a first image sensor 342 of the first image capture device 304. For example, the first image capture device 304 may include a first lens barrel (not expressly shown), extending from the first lens 330 to the first image sensor 342.

The second image capture device 306 defines a second field-of-view 344 wherein the second lens 332 receives light. The second lens 332 directs the received light corresponding to the second field-of-view 344 onto a second image sensor 346 of the second image capture device 306. For example, the second image capture device 306 may include a second lens barrel (not expressly shown), extending from the second lens 332 to the second image sensor 346.

A boundary 348 of the first field-of-view 340 is shown using broken directional lines. A boundary 350 of the second field-of-view 344 is shown using broken directional lines. As shown, the image capture devices 304, 306 are arranged in a back-to-back (Janus) configuration such that the lenses 330, 332 face in opposite directions, and such that the image capture apparatus 300 may capture spherical images. The first image sensor 342 captures a first hyper-hemispherical image plane from light entering the first lens 330. The second image sensor 346 captures a second hyper-hemispherical image plane from light entering the second lens 332.

As shown in FIG. 3, the fields-of-view 340, 344 partially overlap such that the combination of the fields-of-view 340, 344 forms a spherical field-of-view, except that one or more uncaptured areas 352, 354 may be outside of the fields-of-view 340, 344 of the lenses 330, 332. Light emanating from or passing through the uncaptured areas 352, 354, which may be proximal to the image capture apparatus 300, may be obscured from the lenses 330, 332 and the corresponding image sensors 342, 346, such that content corresponding to the uncaptured areas 352, 354 may be omitted from images captured by the image capture apparatus 300. In some implementations, the image capture devices 304, 306, or the lenses 330, 332 thereof, may be configured to minimize the uncaptured areas 352, 354.

Examples of points of transition, or overlap points, from the uncaptured areas 352, 354 to the overlapping portions of the fields-of-view 340, 344 are shown at 356, 358.

Images contemporaneously captured by the respective image sensors 342, 346 may be combined to form a combined image, such as a spherical image. Generating a combined image may include correlating the overlapping regions captured by the respective image sensors 342, 346, aligning the captured fields-of-view 340, 344, and stitching the images together to form a cohesive combined image. Stitching the images together may include correlating the overlap points 356, 358 with respective locations in corresponding images captured by the image sensors 342, 346. Although a planar view of the fields-of-view 340, 344 is shown in FIG. 3, the fields-of-view 340, 344 are hyperhemispherical.

A change in the alignment, such as position, tilt, or a combination thereof, of the image capture devices 304, 306, such as of the lenses 330, 332, the image sensors 342, 346, or both, may change the relative positions of the respective fields-of-view 340, 344, may change the locations of the overlap points 356, 358, such as with respect to images captured by the image sensors 342, 346, and may change the uncaptured areas 352, 354, which may include changing the uncaptured areas 352, 354 unequally.

Incomplete or inaccurate information indicating the alignment of the image capture devices 304, 306, such as the locations of the overlap points 356, 358, may decrease the accuracy, efficiency, or both of generating a combined image. In some implementations, the image capture apparatus 300 may maintain information indicating the location and orientation of the image capture devices 304, 306, such as of the lenses 330, 332, the image sensors 342, 346, or both, such that the fields-of-view 340, 344, the overlap points 356, 358, or both may be accurately determined, which may improve the accuracy, efficiency, or both of generating a combined image.

The lenses 330, 332 may be aligned along an axis X as shown, laterally offset from each other (not shown), off-center from a central axis of the image capture apparatus 300 (not shown), or laterally offset and off-center from the central axis (not shown). Whether through use of offset or through use of compact image capture devices 304, 306, a reduction in distance between the lenses 330, 332 along the axis X may improve the overlap in the fields-of-view 340, 344, such as by reducing the uncaptured areas 352, 354.

Images or frames captured by the image capture devices 304, 306 may be combined, merged, or stitched together to produce a combined image, such as a spherical or panoramic image, which may be an equirectangular planar image. In some implementations, generating a combined image may include use of techniques such as noise reduction, tone mapping, white balancing, or other image correction. In some implementations, pixels along a stitch boundary, which may correspond with the overlap points 356, 358, may be matched accurately to minimize boundary discontinuities.

Figure 4A:
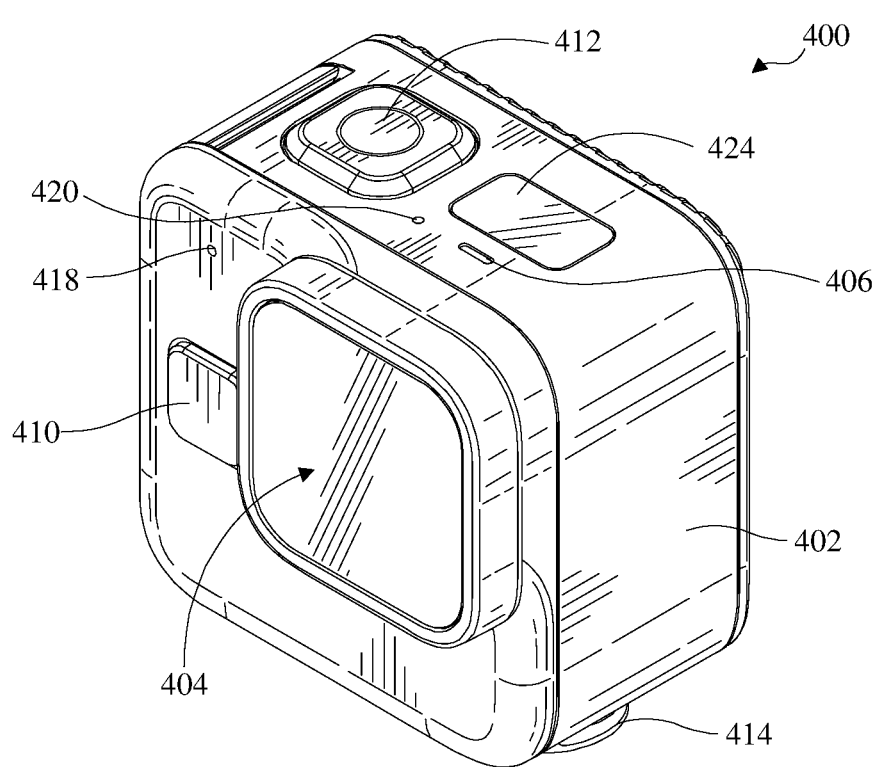
FIGS. 4A-4B are isometric views of another example of an image capture apparatus.
Figure 4B:
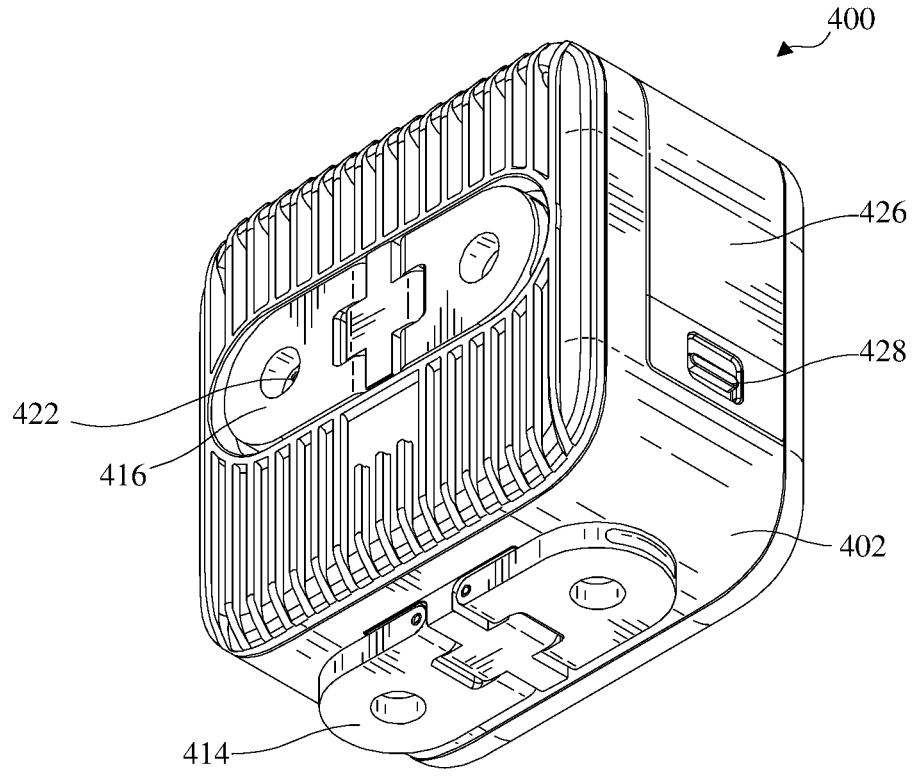

FIGS. 4A-4B illustrate another example of an image capture apparatus 400. The image capture apparatus 400 is similar to the image capture apparatus 100 shown in FIGS. 1A-1B and to the image capture apparatus 200 shown in FIGS. 2A-2B. The image capture apparatus 400 includes a body 402, an image capture device 404, an indicator 406, a mode button 410, a shutter button 412, interconnect mechanisms 414, 416, audio components 418, 420, 422, a display 424, and a door 426 including a release mechanism 428. The arrangement of the components of the image capture apparatus 400 shown in FIGS. 4A-4B is an example, other arrangements of elements may be used.

The body 402 of the image capture apparatus 400 may be similar to the body 102 shown in FIGS. 1A-1B. The image capture device 404 is structured on a front surface of the body 402. The image capture device 404 includes a lens and may be similar to the image capture device 104 shown in FIG. 1A.

As shown in FIG. 4A, the image capture apparatus 400 includes the indicator 406 on a top surface of the body 402. The indicator 406 may be similar to the indicator 106 shown in FIG. 1A. The indicator 406 may indicate a status of the image capture device 204. Although one indicator 406 is shown in FIGS. 4A, the image capture apparatus 400 may include other indictors structured on respective surfaces of the body 402.

As shown in FIGS. 4A, the image capture apparatus 400 includes input mechanisms including the mode button 410, structured on a front surface of the body 402, and the shutter button 412, structured on a top surface of the body 402. The mode button 410 may be similar to the mode button 110 shown in FIG. 1B. The shutter button 412 may be similar to the shutter button 112 shown in FIG. 1A.

The image capture apparatus 400 includes internal electronics (not expressly shown), such as imaging electronics, power electronics, and the like, internal to the body 402 for capturing images and performing other functions of the image capture apparatus 400. An example showing internal electronics is shown in FIG. 5.

As shown in FIGS. 4A-4B, the image capture apparatus 400 includes the interconnect mechanisms 414, 416, with a first interconnect mechanism 414 structured on a bottom surface of the body 402 and a second interconnect mechanism 416 disposed within a rear surface of the body 402. The interconnect mechanisms 414, 416 may be similar to the interconnect mechanism 140 shown in FIG. 1B and the interconnect mechanism 214 shown in FIG. 2A.

As shown in FIGS. 4A-4B, the image capture apparatus 400 includes the audio components 418, 420, 422 respectively structured on respective surfaces of the body 402. The audio components 418, 420, 422 may be similar to the microphones 128, 130, 132 and the speaker 138 shown in FIGS. 1A-1B. One or more of the audio components 418, 420, 422 may be, or may include, audio sensors, such as microphones, to receive and record audio signals, such as voice commands or other audio, in conjunction with capturing images or video. One or more of the audio components 418, 420, 422 may be, or may include, an audio presentation component that may present, or play, audio, such as to provide notifications or alerts.

As shown in FIGS. 4A-4B, a first audio component 418 is located on a front surface of the body 402, a second audio component 420 is located on a top surface of the body 402, and a third audio component 422 is located on a rear surface of the body 402. Other numbers and configurations for the audio components 418, 420, 422 may be used.

As shown in FIG. 4A, the image capture apparatus 400 includes the display 424 structured on a front surface of the body 402. The display 424 may be similar to the displays 108, 142 shown in FIGS. 1A-1B. The display 424 may include an I/O interface. The display 424 may receive touch inputs. The display 424 may display image information during video capture. The display 424 may provide status information to a user, such as status information indicating battery power level, memory card capacity, time elapsed for a recorded video, etc. The image capture apparatus 400 may include multiple displays structured on respective surfaces of the body 402. In some implementations, the display 424 may be omitted or combined with another component of the image capture apparatus 200.

As shown in FIG. 4B, the image capture apparatus 400 includes the door 426 structured on, or forming a portion of, the side surface of the body 402. The door 426 may be similar to the door 226 shown in FIG. 2B. The door 426 shown in FIG. 4B includes the release mechanism 428. The release mechanism 428 may include a latch, a button, or other mechanism configured to receive a user input that allows the door 426 to change position. The release mechanism 428 may be used to open the door 426 for a user to access a battery, a battery receptacle, an I/O interface, a memory card interface, etc.

In some embodiments, the image capture apparatus 400 may include features or components other than those described herein, some features or components described herein may be omitted, or some features or components described herein may be combined. For example, the image capture apparatus 400 may include additional interfaces or different interface features, interchangeable lenses, cold shoes, or hot shoes.

FIG. 5 is a block diagram of electronic components in an image capture apparatus 500. The image capture apparatus 500 may be a single-lens image capture device, a multi-lens image capture device, or variations thereof, including an image capture apparatus with multiple capabilities such as the use of interchangeable integrated sensor lens assemblies. Components, such as electronic components, of the image capture apparatus 100 shown in FIGS. 1A-B, the image capture apparatus 200 shown in FIGS. 2A-B, the image capture apparatus 300 shown in FIG. 3, or the image capture apparatus 400 shown in FIGS. 4A-4B, may be implemented as shown in FIG. 5.

The image capture apparatus 500 includes a body 502. The body 502 may be similar to the body 102 shown in FIGS. 1A-1B, the body 202 shown in FIGS. 2A-2B, or the body 402 shown in FIGS. 4A-4B. The body 502 includes electronic components such as capture components 510, processing components 520, data interface components 530, spatial sensors 540, power components 550, user interface components 560, and a bus 580.

The capture components 510 include an image sensor 512 for capturing images. Although one image sensor 512 is shown in FIG. 5, the capture components 510 may include multiple image sensors. The image sensor 512 may be similar to the image sensors 342, 346 shown in FIG. 3. The image sensor 512 may be, for example, a charge-coupled device (CCD) sensor, an active pixel sensor (APS), a complementary metal-oxide-semiconductor (CMOS) sensor, or an N-type metal-oxide-semiconductor (NMOS) sensor. The image sensor 512 detects light, such as within a defined spectrum, such as the visible light spectrum or the infrared spectrum, incident through a corresponding lens such as the first lens 330 with respect to the first image sensor 342 or the second lens 332 with respect to the second image sensor 346 as shown in FIG. 3. The image sensor 512 captures detected light as image data and conveys the captured image data as electrical signals (image signals or image data) to the other components of the image capture apparatus 500, such as to the processing components 520, such as via the bus 580.

The capture components 510 include a microphone 514 for capturing audio. Although one microphone 514 is shown in FIG. 5, the capture components 510 may include multiple microphones. The microphone 514 detects and captures, or records, sound, such as sound waves incident upon the microphone 514. The microphone 514 may detect, capture, or record sound in conjunction with capturing images by the image sensor 512. The microphone 514 may detect sound to receive audible commands to control the image capture apparatus 500. The microphone 514 may be similar to the microphones 128, 130, 132 shown in FIGS. 1A-1B, the audio components 218, 220, 222 shown in FIGS. 2A-2B, or the audio components 418, 420, 422 shown in FIGS. 4A-4B.

The processing components 520 perform image signal processing, such as filtering, tone mapping, or stitching, to generate, or obtain, processed images, or processed image data, based on image data obtained from the image sensor 512. The processing components 520 may include one or more processors having single or multiple processing cores. In some implementations, the processing components 520 may include, or may be, an application specific integrated circuit (ASIC) or a digital signal processor (DSP). For example, the processing components 520 may include a custom image signal processor. The processing components 520 conveys data, such as processed image data, with other components of the image capture apparatus 500 via the bus 580. In some implementations, the processing components 520 may include an encoder, such as an image or video encoder that may encode, decode, or both, the image data, such as for compression coding, transcoding, or a combination thereof.

Although not shown expressly in FIG. 5, the processing components 520 may include memory, such as a random-access memory (RAM) device, which may be non-transitory computer-readable memory. The memory of the processing components 520 may include executable instructions and data that can be accessed by the processing components 520.

The data interface components 530 communicates with other, such as external, electronic devices, such as a remote control, a smartphone, a tablet computer, a laptop computer, a desktop computer, or an external computer storage device. For example, the data interface components 530 may receive commands to operate the image capture apparatus 500. In another example, the data interface components 530 may transmit image data to transfer the image data to other electronic devices. The data interface components 530 may be configured for wired communication, wireless communication, or both. As shown, the data interface components 530 include an I/O interface 532, a wireless data interface 534, and a storage interface 536. In some implementations, one or more of the I/O interface 532, the wireless data interface 534, or the storage interface 536 may be omitted or combined.

The I/O interface 532 may send, receive, or both, wired electronic communications signals. For example, the I/O interface 532 may be a universal serial bus (USB) interface, such as USB type-C interface, a high-definition multimedia interface (HDMI), a FireWire interface, a digital video interface link, a display port interface link, a Video Electronics Standards Associated (VESA) digital display interface link, an Ethernet link, or a Thunderbolt link. Although one I/O interface 532 is shown in FIG. 5, the data interface components 530 include multiple I/O interfaces. The I/O interface 532 may be similar to the data interface 124 shown in FIG. 1B.

The wireless data interface 534 may send, receive, or both, wireless electronic communications signals. The wireless data interface 534 may be a Bluetooth interface, a ZigBee interface, a Wi-Fi interface, an infrared link, a cellular link, a near field communications (NFC) link, or an Advanced Network Technology interoperability (ANT+) link. Although one wireless data interface 534 is shown in FIG. 5, the data interface components 530 include multiple wireless data interfaces. The wireless data interface 534 may be similar to the data interface 124 shown in FIG. 1B.

The storage interface 536 may include a memory card connector, such as a memory card receptacle, configured to receive and operatively couple to a removable storage device, such as a memory card, and to transfer, such as read, write, or both, data between the image capture apparatus 500 and the memory card, such as for storing images, recorded audio, or both captured by the image capture apparatus 500 on the memory card. Although one storage interface 536 is shown in FIG. 5, the data interface components 530 include multiple storage interfaces. The storage interface 536 may be similar to the data interface 124 shown in FIG. 1B.

The spatial, or spatiotemporal, sensors 540 detect the spatial position, movement, or both, of the image capture apparatus 500. As shown in FIG. 5, the spatial sensors 540 include a position sensor 542, an accelerometer 544, and a gyroscope 546. The position sensor 542, which may be a global positioning system (GPS) sensor, may determine a geospatial position of the image capture apparatus 500, which may include obtaining, such as by receiving, temporal data, such as via a GPS signal. The accelerometer 544, which may be a three-axis accelerometer, may measure linear motion, linear acceleration, or both of the image capture apparatus 500. The gyroscope 546, which may be a three-axis gyroscope, may measure rotational motion, such as a rate of rotation, of the image capture apparatus 500. In some implementations, the spatial sensors 540 may include other types of spatial sensors. In some implementations, one or more of the position sensor 542, the accelerometer 544, and the gyroscope 546 may be omitted or combined.

The power components 550 distribute electrical power to the components of the image capture apparatus 500 for operating the image capture apparatus 500. As shown in FIG. 5, the power components 550 include a battery interface 552, a battery 554, and an external power interface 556 (ext. interface). The battery interface 552 (bat. interface) operatively couples to the battery 554, such as via conductive contacts to transfer power from the battery 554 to the other electronic components of the image capture apparatus 500. The battery interface 552 may be similar to the battery receptacle 126 shown in FIG. 1B. The external power interface 556 obtains or receives power from an external source, such as a wall plug or external battery, and distributes the power to the components of the image capture apparatus 500, which may include distributing power to the battery 554 via the battery interface 552 to charge the battery 554. Although one battery interface 552, one battery 554, and one external power interface 556 are shown in FIG. 5, any number of battery interfaces, batteries, and external power interfaces may be used. In some implementations, one or more of the battery interface 552, the battery 554, and the external power interface 556 may be omitted or combined. For example, in some implementations, the external interface 556 and the I/O interface 532 may be combined.

The user interface components 560 receive input, such as user input, from a user of the image capture apparatus 500, output, such as display or present, information to a user, or both receive input and output information, such as in accordance with user interaction with the image capture apparatus 500.

As shown in FIG. 5, the user interface components 560 include visual output components 562 to visually communicate information, such as to present captured images. As shown, the visual output components 562 include an indicator 564 and a display 566. The indicator 564 may be similar to the indicator 106 shown in FIG. 1A, the indicators 208 shown in FIGS. 2A-2B, or the indicator 406 shown in FIG. 4A. The display 566 may be similar to the display 108 shown in FIG. 1A, the display 142 shown in FIG. 1B, the display 224 shown in FIG. 2B, or the display 424 shown in FIG. 4A. Although the visual output components 562 are shown in FIG. 5 as including one indicator 564, the visual output components 562 may include multiple indicators. Although the visual output components 562 are shown in FIG. 5 as including one display 566, the visual output components 562 may include multiple displays. In some implementations, one or more of the indicator 564 or the display 566 may be omitted or combined.

As shown in FIG. 5, the user interface components 560 include a speaker 568. The speaker 568 may be similar to the speaker 138 shown in FIG. 1B, the audio components 218, 220, 222 shown in FIGS. 2A-2B, or the audio components 418, 420, 422 shown in FIGS. 4A-4B. Although one speaker 568 is shown in FIG. 5, the user interface components 560 may include multiple speakers. In some implementations, the speaker 568 may be omitted or combined with another component of the image capture apparatus 500, such as the microphone 514.

As shown in FIG. 5, the user interface components 560 include a physical input interface 570. The physical input interface 570 may be similar to the mode buttons 110, 210, 410 shown in FIGS. 1A, 2A, and 4A or the shutter buttons 112, 212, 412 shown in FIGS. 1A, 2B, and 4A. Although one physical input interface 570 is shown in FIG. 5, the user interface components 560 may include multiple physical input interfaces. In some implementations, the physical input interface 570 may be omitted or combined with another component of the image capture apparatus 500. The physical input interface 570 may be, for example, a button, a toggle, a switch, a dial, or a slider.

As shown in FIG. 5, the user interface components 560 include a broken line border box labeled "other" to indicate that components of the image capture apparatus 500 other than the components expressly shown as included in the user interface components 560 may be user interface components. For example, the microphone 514 may receive, or capture, and process audio signals to obtain input data, such as user input data corresponding to voice commands. In another example, the image sensor 512 may receive, or capture, and process image data to obtain input data, such as user input data corresponding to visible gesture commands. In another example, one or more of the spatial sensors 540, such as a combination of the accelerometer 544 and the gyroscope 546, may receive, or capture, and process motion data to obtain input data, such as user input data corresponding to motion gesture commands.

Figure 6:
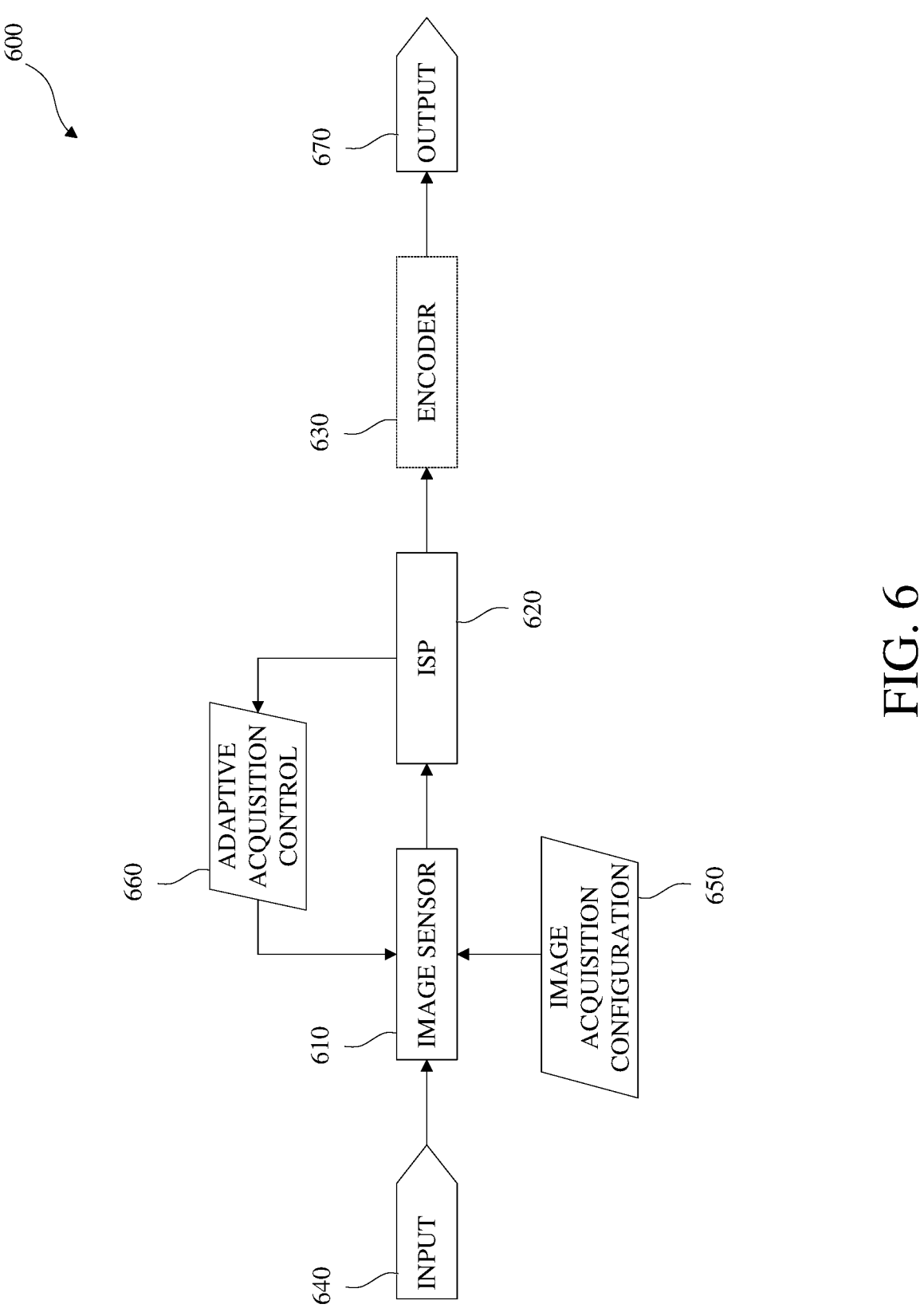
FIG. 6 is a flow diagram of an example of an image processing pipeline.

FIG. 6 is a block diagram of an example of an image processing pipeline 600. The image processing pipeline 600, or a portion thereof, is implemented in an image capture apparatus, such as the image capture apparatus 100 shown in FIGS. 1A-1B, the image capture apparatus 200 shown in FIGS. 2A-2B, the image capture apparatus 300 shown in FIG. 3, the image capture apparatus 400 shown in FIGS. 4A-4B, or another image capture apparatus. In some implementations, the image processing pipeline 600 may be implemented in a digital signal processor (DSP), an application-specific integrated circuit (ASIC), or a combination of a digital signal processor and an application-specific integrated circuit. One or more components of the pipeline 600 may be implemented in hardware, software, or a combination of hardware and software.

As shown in FIG. 6, the image processing pipeline 600 includes an image sensor 610, an ISP 620, and an encoder 630. The encoder 630 is shown with a broken line border to indicate that the encoder may be omitted, or absent, from the image processing pipeline 600. In some implementations, the encoder 630 may be included in another device. In implementations that include the encoder 630, the image processing pipeline 600 may be an image processing and coding pipeline. The image processing pipeline 600 may include components other than the components shown in FIG. 6.

The image sensor 610 receives input 640, such as photons incident on the image sensor 610. The image sensor 610 captures image data (source image data). Capturing source image data includes measuring or sensing the input 640, which may include counting, or otherwise measuring, photons incident on the image sensor 610, such as for a defined temporal duration or period (exposure). Capturing source image data includes converting the analog input 640 to a digital source image signal in a defined format, which may be referred to herein as "a raw image signal." For example, the raw image signal may be in a format such as RGB format, which may represent individual pixels using a combination of values or components, such as a red component (R), a green component (G), and a blue component (B). In another example, the raw image signal may be in a Bayer format, wherein a respective pixel may be one of a combination of adjacent pixels, such as a combination of four adjacent pixels, of a Bayer pattern.

Although one image sensor 610 is shown in FIG. 6, the image processing pipeline 600 may include two or more image sensors. In some implementations, an image, or frame, such as an image, or frame, included in the source image signal, may be one of a sequence or series of images or frames of a video, such as a sequence, or series, of frames captured at a rate, or frame rate, which may be a number or cardinality of frames captured per defined temporal period, such as twenty-four, thirty, sixty, or one-hundred twenty frames per second.

The image sensor 610 obtains image acquisition configuration data 650. The image acquisition configuration data 650 may include image cropping parameters, binning/skipping parameters, pixel rate parameters, bitrate parameters, resolution parameters, framerate parameters, or other image acquisition configuration data or combinations of image acquisition configuration data. Obtaining the image acquisition configuration data 650 may include receiving the image acquisition configuration data 650 from a source other than a component of the image processing pipeline 600. For example, the image acquisition configuration data 650, or a portion thereof, may be received from another component, such as a user interface component, of the image capture apparatus implementing the image processing pipeline 600, such as one or more of the user interface components 560 shown in FIG. 5. The image sensor 610 obtains, outputs, or both, the source image data in accordance with the image acquisition configuration data 650. For example, the image sensor 610 may obtain the image acquisition configuration data 650 prior to capturing the source image.

The image sensor 610 receives, or otherwise obtains or accesses, adaptive acquisition control data 660, such as auto exposure (AE) data, auto white balance (AWB) data, global tone mapping (GTM) data, Auto Color Lens Shading (ACLS) data, color correction data, or other adaptive acquisition control data or combination of adaptive acquisition control data. For example, the image sensor 610 receives the adaptive acquisition control data 660 from the image signal processor 620. The image sensor 610 obtains, outputs, or both, the source image data in accordance with the adaptive acquisition control data 660.

The image sensor 610 controls, such as configures, sets, or modifies, one or more image acquisition parameters or settings, or otherwise controls the operation of the image signal processor 620, in accordance with the image acquisition configuration data 650 and the adaptive acquisition control data 660. For example, the image sensor 610 may capture a first source image using, or in accordance with, the image acquisition configuration data 650, and in the absence of adaptive acquisition control data 660 or using defined values for the adaptive acquisition control data 660, output the first source image to the image signal processor 620, obtain adaptive acquisition control data 660 generated using the first source image data from the image signal processor 620, and capture a second source image using, or in accordance with, the image acquisition configuration data 650 and the adaptive acquisition control data 660 generated using the first source image. In an example, the adaptive acquisition control data 660 may include an exposure duration value and the image sensor 610 may capture an image in accordance with the exposure duration value.

The image sensor 610 outputs source image data, which may include the source image signal, image acquisition data, or a combination thereof, to the image signal processor 620.

The image signal processor 620 receives, or otherwise accesses or obtains, the source image data from the image sensor 610. The image signal processor 620 processes the source image data to obtain input image data. In some implementations, the image signal processor 620 converts the raw image signal (RGB data) to another format, such as a format expressing individual pixels using a combination of values or components, such as a luminance, or luma, value (Y), a blue chrominance, or chroma, value (U or Cb), and a red chroma value (V or Cr), such as the YUV or YCbCr formats.

Processing the source image data includes generating the adaptive acquisition control data 660. The adaptive acquisition control data 660 includes data for controlling the acquisition of a one or more images by the image sensor 610.

The image signal processor 620 includes components not expressly shown in FIG. 6 for obtaining and processing the source image data. For example, the image signal processor 620 may include one or more sensor input (SEN) components (not shown), one or more sensor readout (SRO) components (not shown), one or more image data compression components, one or more image data decompression components, one or more internal memory, or data storage, components, one or more Bayer-to-Bayer (B2B) components, one or more local motion estimation (LME) components, one or more local motion compensation (LMC) components, one or more global motion compensation (GMC) components, one or more Bayer-to-RGB (B2R) components, one or more image processing units (IPU), one or more high dynamic range (HDR) components, one or more three-dimensional noise reduction (3DNR) components, one or more sharpening components, one or more raw-to-YUV (R2Y) components, one or more Chroma Noise Reduction (CNR) components, one or more local tone mapping (LTM) components, one or more YUV-to-YUV (Y2Y) components, one or more warp and blend components, one or more stitching cost components, one or more scaler components, or a configuration controller. The image signal processor 620, or respective components thereof, may be implemented in hardware, software, or a combination of hardware and software. Although one image signal processor 620 is shown in FIG. 6, the image processing pipeline 600 may include multiple image signal processors. In implementations that include multiple image signal processors, the functionality of the image signal processor 620 may be divided or distributed among the image signal processors.

In some implementations, the image signal processor 620 may implement or include multiple parallel, or partially parallel paths for image processing. For example, for high dynamic range image processing based on two source images, the image signal processor 620 may implement a first image processing path for a first source image and a second image processing path for a second source image, wherein the image processing paths may include components that are shared among the paths, such as memory components, and may include components that are separately included in each path, such as a first sensor readout component in the first image processing path and a second sensor readout component in the second image processing path, such that image processing by the respective paths may be performed in parallel, or partially in parallel.

The image signal processor 620, or one or more components thereof, such as the sensor input components, may perform black-point removal for the image data. In some implementations, the image sensor 610 may compress the source image data, or a portion thereof, and the image signal processor 620, or one or more components thereof, such as one or more of the sensor input components or one or more of the image data decompression components, may decompress the compressed source image data to obtain the source image data.

The image signal processor 620, or one or more components thereof, such as the sensor readout components, may perform dead pixel correction for the image data. The sensor readout component may perform scaling for the image data. The sensor readout component may obtain, such as generate or determine, adaptive acquisition control data, such as auto exposure data, auto white balance data, global tone mapping data, Auto Color Lens Shading data, or other adaptive acquisition control data, based on the source image data.

The image signal processor 620, or one or more components thereof, such as the image data compression components, may obtain the image data, or a portion thereof, such as from another component of the image signal processor 620, compress the image data, and output the compressed image data, such as to another component of the image signal processor 620, such as to a memory component of the image signal processor 620.

The image signal processor 620, or one or more components thereof, such as the image data decompression, or uncompression, components (UCX), may read, receive, or otherwise access, compressed image data and may decompress, or uncompress, the compressed image data to obtain image data. In some implementations, other components of the image signal processor 620 may request, such as send a request message or signal, the image data from an uncompression component, and, in response to the request, the uncompression component may obtain corresponding compressed image data, uncompress the compressed image data to obtain the requested image data, and output, such as send or otherwise make available, the requested image data to the component that requested the image data. The image signal processor 620 may include multiple uncompression components, which may be respectively optimized for uncompression with respect to one or more defined image data formats.

The image signal processor 620, or one or more components thereof, such as the internal memory, or data storage, components. The memory components store image data, such as compressed image data internally within the image signal processor 620 and are accessible to the image signal processor 620, or to components of the image signal processor 620. In some implementations, a memory component may be accessible, such as write accessible, to a defined component of the image signal processor 620, such as an image data compression component, and the memory component may be accessible, such as read accessible, to another defined component of the image signal processor 620, such as an uncompression component of the image signal processor 620.

The image signal processor 620, or one or more components thereof, such as the Bayer-to-Bayer components, which may process image data, such as to transform or convert the image data from a first Bayer format, such as a signed 15-bit Bayer format data, to second Bayer format, such as an unsigned 14-bit Bayer format. The Bayer-to-Bayer components may obtain, such as generate or determine, high dynamic range Tone Control data based on the current image data.

Although not expressly shown in FIG. 6, in some implementations, a respective Bayer-to-Bayer component may include one or more sub-components. For example, the Bayer-to-Bayer component may include one or more gain components. In another example, the Bayer-to-Bayer component may include one or more offset map components, which may respectively apply respective offset maps to the image data. The respective offset maps may have a configurable size, which may have a maximum size, such as 129×129. The respective offset maps may have a non-uniform grid. Applying the offset map may include saturation management, which may preserve saturated areas on respective images based on R, G, and B values. The values of the offset map may be modified per-frame and double buffering may be used for the map values. A respective offset map component may, such as prior to Bayer noise removal (denoising), compensate for non-uniform black point removal, such as due to non-uniform thermal heating of the sensor or image capture device. A respective offset map component may, such as subsequent to Bayer noise removal, compensate for flare, such as flare on hemispherical lenses, and/or may perform local contrast enhancement, such a dehazing or local tone mapping.

In another example, the Bayer-to-Bayer component may include a Bayer Noise Reduction (Bayer NR) component, which may convert image data, such as from a first format, such as a signed 15-bit Bayer format, to a second format, such as an unsigned 14-bit Bayer format. In another example, the Bayer-to-Bayer component may include one or more lens shading (FSHD) component, which may, respectively, perform lens shading correction, such as luminance lens shading correction, color lens shading correction, or both. In some implementations, a respective lens shading component may perform exposure compensation between two or more sensors of a multi-sensor image capture apparatus, such as between two hemispherical lenses. In some implementations, a respective lens shading component may apply map-based gains, radial model gain, or a combination, such as a multiplicative combination, thereof. In some implementations, a respective lens shading component may perform saturation management, which may preserve saturated areas on respective images. Map and lookup table values for a respective lens shading component may be configured or modified on a per-frame basis and double buffering may be used.

In another example, the Bayer-to-Bayer component may include a PZSFT component. In another example, the Bayer-to-Bayer component may include a half-RGB (½ RGB) component. In another example, the Bayer-to-Bayer component may include a color correction (CC) component, which may obtain subsampled data for local tone mapping, which may be used, for example, for applying an unsharp mask. In another example, the Bayer-to-Bayer component may include a Tone Control (TC) component, which may obtain subsampled data for local tone mapping, which may be used, for example, for applying an unsharp mask. In another example, the Bayer-to-Bayer component may include a Gamma (GM) component, which may apply a lookup-table independently per channel for color rendering (gamma curve application). Using a lookup-table, which may be an array, may reduce resource utilization, such as processor utilization, using an array indexing operation rather than more complex computation. The gamma component may obtain subsampled data for local tone mapping, which may be used, for example, for applying an unsharp mask.

In another example, the Bayer-to-Bayer component may include an RGB binning (RGB BIN) component, which may include a configurable binning factor, such as a binning factor configurable in the range from four to sixteen, such as four, eight, or sixteen. One or more sub-components of the Bayer-to-Bayer component, such as the RGB Binning component and the half-RGB component, may operate in parallel. The RGB binning component may output image data, such as to an external memory, which may include compressing the image data. The output of the RGB binning component may be a binned image, which may include low-resolution image data or low-resolution image map data. The output of the RGB binning component may be used to extract statistics for combing images, such as combining hemispherical images. The output of the RGB binning component may be used to estimate flare on one or more lenses, such as hemispherical lenses. The RGB binning component may obtain G channel values for the binned image by averaging Gr channel values and Gb channel values. The RGB binning component may obtain one or more portions of or values for the binned image by averaging pixel values in spatial areas identified based on the binning factor. In another example, the Bayer-to-Bayer component may include, such as for spherical image processing, an RGB-to-YUV component, which may obtain tone mapping statistics, such as histogram data and thumbnail data, using a weight map, which may weight respective regions of interest prior to statistics aggregation.

The image signal processor 620, or one or more components thereof, such as the local motion estimation components, which may generate local motion estimation data for use in image signal processing and encoding, such as in correcting distortion, stitching, and/or motion compensation. For example, the local motion estimation components may partition an image into blocks, arbitrarily shaped patches, individual pixels, or a combination thereof. The local motion estimation components may compare pixel values between frames, such as successive images, to determine displacement, or movement, between frames, which may be expressed as motion vectors (local motion vectors).

The image signal processor 620, or one or more components thereof, such as the local motion compensation components, which may obtain local motion data, such as local motion vectors, and may spatially apply the local motion data to an image to obtain a local motion compensated image or frame and may output the local motion compensated image or frame to one or more other components of the image signal processor 620.

The image signal processor 620, or one or more components thereof, such as the global motion compensation components, may receive, or otherwise access, global motion data, such as global motion data from a gyroscopic unit of the image capture apparatus, such as the gyroscope 546 shown in FIG. 5, corresponding to the current frame. The global motion compensation component may apply the global motion data to a current image to obtain a global motion compensated image, which the global motion compensation component may output, or otherwise make available, to one or more other components of the image signal processor 620.

The image signal processor 620, or one or more components thereof, such as the Bayer-to-RGB components, which convert the image data from Bayer format to an RGB format. The Bayer-to-RGB components may implement white balancing and demosaicing. The Bayer-to-RGB components respectively output, or otherwise make available, RGB format image data to one or more other components of the image signal processor 620.

The image signal processor 620, or one or more components thereof, such as the image processing units, which perform warping, image registration, electronic image stabilization, motion detection, object detection, or the like. The image processing units respectively output, or otherwise make available, processed, or partially processed, image data to one or more other components of the image signal processor 620.

The image signal processor 620, or one or more components thereof, such as the high dynamic range components, may, respectively, generate high dynamic range images based on the current input image, the corresponding local motion compensated frame, the corresponding global motion compensated frame, or a combination thereof. The high dynamic range components respectively output, or otherwise make available, high dynamic range images to one or more other components of the image signal processor 620.

The high dynamic range components of the image signal processor 620 may, respectively, include one or more high dynamic range core components, one or more tone control (TC) components, or one or more high dynamic range core components and one or more tone control components. For example, the image signal processor 620 may include a high dynamic range component that includes a high dynamic range core component and a tone control component. The high dynamic range core component may obtain, or generate, combined image data, such as a high dynamic range image, by merging, fusing, or combining the image data, such as unsigned 14-bit RGB format image data, for multiple, such as two, images (HDR fusion) to obtain, and output, the high dynamic range image, such as in an unsigned 23-bit RGB format (full dynamic data). The high dynamic range core component may output the combined image data to the Tone Control component, or to other components of the image signal processor 620. The Tone Control component may compress the combined image data, such as from the unsigned 23-bit RGB format data to an unsigned 17-bit RGB format (enhanced dynamic data).

The image signal processor 620, or one or more components thereof, such as the three-dimensional noise reduction components reduce image noise for a frame based on one or more previously processed frames and output, or otherwise make available, noise reduced images to one or more other components of the image signal processor 620. In some implementations, the three-dimensional noise reduction component may be omitted or may be replaced by one or more lower-dimensional noise reduction components, such as by a spatial noise reduction component. The three-dimensional noise reduction components of the image signal processor 620 may, respectively, include one or more temporal noise reduction (TNR) components, one or more raw-to-raw (R2R) components, or one or more temporal noise reduction components and one or more raw-to-raw components. For example, the image signal processor 620 may include a three-dimensional noise reduction component that includes a temporal noise reduction component and a raw-to-raw component.

The image signal processor 620, or one or more components thereof, such as the sharpening components, obtains sharpened image data based on the image data, such as based on noise reduced image data, which may recover image detail, such as detail reduced by temporal denoising or warping. The sharpening components respectively output, or otherwise make available, sharpened image data to one or more other components of the image signal processor 620.

The image signal processor 620, or one or more components thereof, such as the raw-to-YUV components, may transform, or convert, image data, such as from the raw image format to another image format, such as the YUV format, which includes a combination of a luminance (Y) component and two chrominance (UV) components. The raw-to-YUV components may, respectively, demosaic, color process, or a both, images.

Although not expressly shown in FIG. 6, in some implementations, a respective raw-to-YUV component may include one or more sub-components. For example, the raw-to-YUV component may include a white balance (WB) component, which performs white balance correction on the image data. In another example, a respective raw-to-YUV component may include one or more color correction components (CC0, CC1), which may implement linear color rendering, which may include applying a 3×3 color matrix. For example, the raw-to-YUV component may include a first color correction component (CC0) and a second color correction component (CC1). In another example, a respective raw-to-YUV component may include a three-dimensional lookup table component, such as subsequent to a first color correction component. Although not expressly shown in FIG. 6, in some implementations, a respective raw-to-YUV component may include a Multi-Axis Color Correction (MCC) component, such as subsequent to a three-dimensional lookup table component, which may implement non-linear color rendering, such as in Hue, Saturation, Value (HSV) space.

In another example, a respective raw-to-YUV component may include a black point RGB removal (BPRGB) component, which may process image data, such as low intensity values, such as values within a defined intensity threshold, such as less than or equal to, 28, to obtain histogram data wherein values exceeding a defined intensity threshold may be omitted, or excluded, from the histogram data processing. In another example, a respective raw-to-YUV component may include a Multiple Tone Control (Multi-TC) component, which may convert image data, such as unsigned 17-bit RGB image data, to another format, such as unsigned 14-bit RGB image data. The Multiple Tone Control component may apply dynamic tone mapping to the Y channel (luminance) data, which may be based on, for example, image capture conditions, such as light conditions or scene conditions. The tone mapping may include local tone mapping, global tone mapping, or a combination thereof.

In another example, a respective raw-to-YUV component may include a Gamma (GM) component, which may convert image data, such as unsigned 14-bit RGB image data, to another format, such as unsigned 10-bit RGB image data. The Gamma component may apply a lookup-table independently per channel for color rendering (gamma curve application). Using a lookup-table, which may be an array, may reduce resource utilization, such as processor utilization, using an array indexing operation rather than more complex computation. In another example, a respective raw-to-YUV component may include a three-dimensional lookup table (3DLUT) component, which may include, or may be, a three-dimensional lookup table, which may map RGB input values to RGB output values through a non-linear function for non-linear color rendering. In another example, a respective raw-to-YUV component may include a Multi-Axis Color Correction (MCC) component, which may implement non-linear color rendering. For example, the multi-axis color correction component may perform color non-linear rendering, such as in Hue, Saturation, Value (HSV) space.

The image signal processor 620, or one or more components thereof, such as the Chroma Noise Reduction (CNR) components, may perform chroma denoising, luma denoising, or both.

The image signal processor 620, or one or more components thereof, such as the local tone mapping components, may perform multi-scale local tone mapping using a single pass approach or a multi-pass approach on a frame at different scales. The as the local tone mapping components may, respectively, enhance detail and may omit introducing artifacts. For example, the Local Tone Mapping components may, respectively, apply tone mapping, which may be similar to applying an unsharp-mask. Processing an image by the local tone mapping components may include obtaining, processing, such as in response to gamma correction, tone control, or both, and using a low-resolution map for local tone mapping.

The image signal processor 620, or one or more components thereof, such as the YUV-to-YUV (Y2Y) components, may perform local tone mapping of YUV images. In some implementations, the YUV-to-YUV components may include multi-scale local tone mapping using a single pass approach or a multi-pass approach on a frame at different scales.

The image signal processor 620, or one or more components thereof, such as the warp and blend components, may warp images, blend images, or both. In some implementations, the warp and blend components may warp a corona around the equator of a respective frame to a rectangle. For example, the warp and blend components may warp a corona around the equator of a respective frame to a rectangle based on the corresponding low-resolution frame. The warp and blend components, may, respectively, apply one or more transformations to the frames, such as to correct for distortions at image edges, which may be subject to a close to identity constraint.

The image signal processor 620, or one or more components thereof, such as the stitching cost components, may generate a stitching cost map, which may be represented as a rectangle having disparity (x) and longitude (y) based on a warping. Respective values of the stitching cost map may be a cost function of a disparity (x) value for a corresponding longitude (y). Stitching cost maps may be generated for various scales, longitudes, and disparities.

The image signal processor 620, or one or more components thereof, such as the scaler components, may scale images, such as in patches, or blocks, of pixels, such as 16×16 blocks, 8×8 blocks, or patches or blocks of any other size or combination of sizes.

The image signal processor 620, or one or more components thereof, such as the configuration controller, may control the operation of the image signal processor 620, or the components thereof.

The image signal processor 620 outputs processed image data, such as by storing the processed image data in a memory of the image capture apparatus, such as external to the image signal processor 620, or by sending, or otherwise making available, the processed image data to another component of the image processing pipeline 600, such as the encoder 630, or to another component of the image capture apparatus.

The encoder 630 encodes or compresses the output of the image signal processor 620. In some implementations, the encoder 630 implements one or more encoding standards, which may include motion estimation. The encoder 630 outputs the encoded processed image to an output 670. In an embodiment that does not include the encoder 630, the image signal processor 620 outputs the processed image to the output 670. The output 670 may include, for example, a display, such as a display of the image capture apparatus, such as one or more of the displays 108, 142 shown in FIGS. 1A-1B, the display 224 shown in FIG. 2B, the display 424 shown in FIG. 4A, or the display 566 shown in FIG. 5, to a storage device, or both. The output 670 is a signal, such as to an external device.

Figure 7:
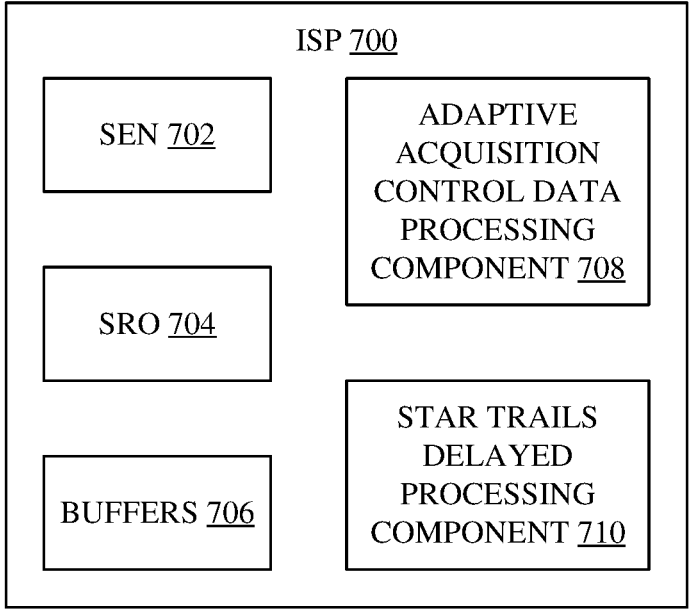
FIG. 7 is a block diagram of an example image signal processor.

FIG. 7 is a block diagram of an example ISP 700. The ISP 700 may correspond to the ISP 620. As shown, the ISP 700 includes a sensor input (SEN) 702, a sensor readout (SRO) 704, buffers 706, an adaptive acquisition control data processing component 708 and a star trails delayed processing component 710.

The SEN 702 obtains input from an image sensor (e.g., associated with a camera lens). The SEN 702 receives light signals from a scene being imaged (e.g., photographed or video recorded) and converts the light signals into electrical signals that can be processed by electronic circuitry of a camera, as described herein. The SEN 702 may include a photodiode array or other light-sensitive components. The SEN 702 may be a photosensitive device, such as a complementary metal-oxide-semiconductor (CMOS) sensor or a charge-coupled device (CCD) sensor.

The SRO 704 retrieves the electrical signals from the SEN 702 and converts the retrieved electrical signals into digital image data that can be stored or displayed. The SRO 704 may perform at least one of amplification, noise reduction, or digitization of signals. Together, the SEN 702 and the SRO 704 convert light signals from the scene into digital image data that can be further processed by hardware or software.

The buffers 706 stored data being processed by the ISP 700. For example, the buffers store the digital image data generated by the SRO 704. The data in the buffers 706 may be flagged for deletion or further processing (or deleted or further processed) using the techniques described herein.

The adaptive acquisition control data processing component 708 obtains adaptive acquisition control data 660 for the visual data accessed by the SEN 702. The adaptive acquisition control data processing component 708 may provide the adaptive acquisition control 660 to the image sensor 610, as shown in FIG. 6. As described above, the adaptive acquisition control data 660 may include at least one of a luminance value, a contrast value, a gain value, an exposure value, or a white balance value. The star trails delayed processing component 710 accesses the adaptive acquisition control data 660 obtained by the adaptive acquisition control data processing component 708 and determines, based on the adaptive acquisition control data 660, whether to use a star trails scene classification (e.g., as opposed to a daytime scene classification) for the images.

A star trails scene classification may include, among other things, a nighttime scene classification for imagery that is to be used to create a star trails photograph and/or a star trails video illustrating circular (relative to a fixed position on or proximate to the Earth's surface) movement of stars in the night sky. Star trails images may be composite images, which may include visual data from multiple different individual photographs. Similarly, a star trails video may include a time lapse view of multiple different photographs taken at different times during the night. To generate star trails imagery, a user typically sets up a camera in the evening (e.g., within two hours before or after the sunset) and leaves the camera in place until the morning (e.g., within two hours before or after the sunrise), while the user does other things (e.g., eats or sleeps) away from the camera. This may result in the star trails imagery including images taken during different environmental (e.g., lighting) conditions, which may be optimized with very different adaptive acquisition control data settings associated with the camera lens. Techniques for automatically obtaining star trails imagery (and daytime imagery) which take into account the different environmental conditions in which this imagery is obtained (e.g., by classifying different images as "star trails" or "daytime") are disclosed herein.

As illustrated, the star trails delayed processing component 710 is included in the ISP 700. In alternative implementations, the star trails delayed processing component 710 may exist outside the ISP 700 (e.g., in another processor or in software implemented by another processor). More details of examples of operation of the ISP 700 and its components are provided in conjunction with FIG. 8 and FIG. 9.

Figure 8:
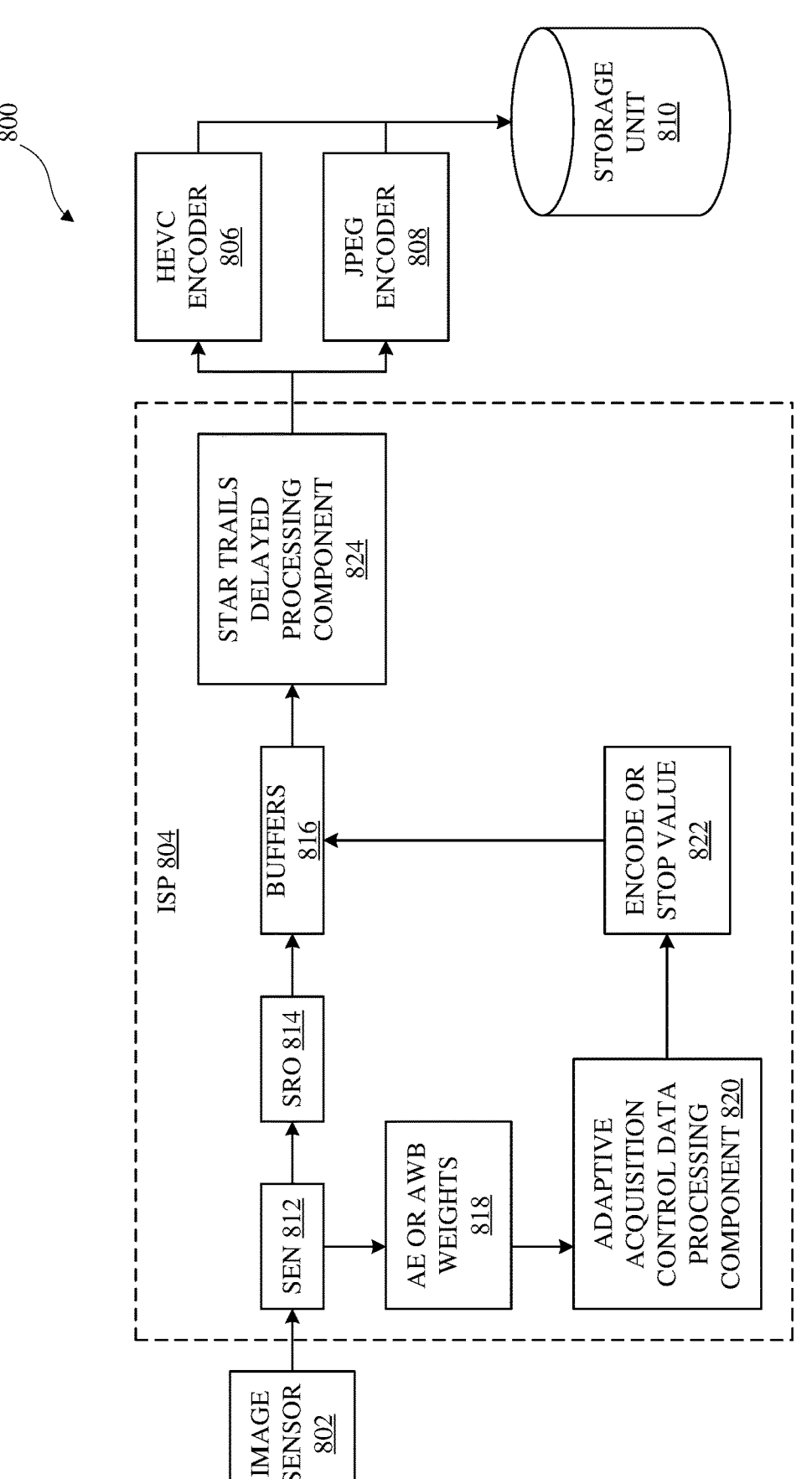
FIG. 8 is a flow diagram of an example pipeline for star trails image processing.

FIG. 8 is a flow diagram of an example pipeline 800 for star trails image processing. As shown in the pipeline 800, an image sensor 802 transmits data (e.g., raw images) to an ISP 804 for processing. The image sensor 802 may correspond to the image sensor 610 of FIG. 6. The image sensor 802 receives light data and converts the light data to electrical data. The image sensor 802 converts from analog to digital data and transmits the digital data to the ISP 804. The ISP 804 may correspond to the ISP 700 of FIG. 7 or the ISP 620 of FIG. 6. The ISP 804 generates processed image data using the data received from the image sensor 802, as described in greater detail below. The output of the ISP 804 is provided to a high efficiency video coding (HEVC) encoder 806 and a joint photograph experts group (JPEG) encoder 808. The HEVC encoder 806 encodes a star trails video file based on the processed image data. The JPEG encoder 808 encodes a star trails image file based on the processed image data. The star trails video file and the star trails image file are provided to a storage unit 810 for storage. The storage unit 810 may correspond to at least one of an internal storage unit of a camera, a removable memory card, or an online storage unit accessible via a network. The HEVC encoder 806 or the JPEG encoder 808 may correspond to the encoder 630 of FIG. 6.

In alternative implementations, a video encoder different from the HEVC encoder 806 may be used, and an image encoder different from the JPEG encoder 808 may be used.

The HEVC encoder 806 may be replaced with a video encoder conforming to a standard different from HEVC. The JPEG encoder 808 may be replaced with an image encoder conforming to a standard different from JPEG.

As shown, the ISP 804 includes a SEN 812. The SEN 812 may correspond to the SEN 702. The SEN 812 receives the digital data (corresponding to the light data) from the image sensor 802. The SEN 812 depacketizes the digital data, collects some statistics and then provides the image in RAW format (e.g., Bayer, Quad Bayer, or another format) to an SRO 814. The SRO 814 may correspond to the SRO 704. The digital data and the image in RAW format represent light intensity and color information for the scene being photographed or video recorded. The SRO 814 further applies some imaging transformations, for example, dead pixel correction, frame shading correction, chromatic aberration correction, or the like. The output of the SRO 814 is then forwarded to the buffers 816 for storage or further processing.

The SRO 814 may perform functions including at least one of amplification, analog-to-digital conversion (ADC), noise reduction, and color processing to generate digital image files corresponding to the scene detected by the image sensor 802. The digital image files are provided to the buffers 816 for temporary storage. The digital image files may include raw images.

As shown, the ISP 804 obtains auto exposure (AE) or auto white balance (AWB) weights 818 based on the image in the RAW format output by the SEN 812. The AE or AWB weights 818 may be obtained in parallel with the operation of the SRO 814. The AE or AWB weights may be used to adjust the exposure or white balance settings of the camera based on the lighting conditions of the scene being photographed or video recorded.

AE weights may be used to adjust the exposure settings such as shutter speed and aperture to achieve the correct exposure for the scene. The AE weights may be calculated based on the brightness levels of different areas of the scene, and the AE weights may be used to determine which areas of the image should be prioritized for exposure adjustment.

AWB weights may be used to adjust the color balance of the image to ensure that the colors appear accurate under different lighting conditions. The AWB weights may be calculated based on the color temperature of the light sources in the scene and are used to adjust the red, green, and blue channels of the image to achieve a neutral color balance.

As illustrated, the AE or AWB weights 818 are provided to an adaptive acquisition control data processing component 820. The adaptive acquisition control data processing component 820 may correspond to the adaptive acquisition control data processing component 708 of FIG. 7. The adaptive acquisition control data processing component 820 obtains adaptive acquisition control data 660 (e.g., a luminance value, a contrast value, a gain value, an exposure value, or a white balance value) in accordance with the image in RAW format output by the SEN 812 and the AE or AWB weights 818. The adaptive acquisition control data processing component 820 determines, in accordance with the adaptive acquisition control data 660, whether to use the star trails scene classification or the daytime scene classification for the analog electrical signal output by the SEN 812. As shown, the encode or stop value 822 is provided to the buffers 816 for temporary storage in conjunction with the digital image files from the SRO 814. The statistics collected by the SEN 812 or the SRO 814 are used by the adaptive acquisition control data processing component 820 to make determinations about whether data in the buffers 816 is to be used for encoding in either video or JPEG format or whether the data in the buffers 816 is to be deleted. The adaptive acquisition control data processing component 820 uses the statistics and generates control data (e.g., exposure, analog gain, or digital gain) for the image sensor 802.

As shown, the output of the adaptive acquisition control data processing component 820 is an encode or stop value 822. The encode or stop value 822 corresponds to "encode" if the star trails scene classification applies. The encode or stop value 822 corresponds to "stop" if the star trails scene classification does not apply (e.g., if the daytime scene classification applies). The encode or stop value 822 may be implemented using at least one of a Boolean data type (e.g., with true corresponding to "encode" and false corresponding to "stop," or vice versa), an integer data type, or other data types.

The star trials delayed processing component 824 accesses data stored in the buffers 816, including the digital image files from the SRO 814 and the encode or stop value 822 from the adaptive acquisition control data processing component 820. The star trails delayed processing component identifies a subset of the digital image files for provision to the HEVC encoder 806 or the JPEG encoder 808 to encode the star trails video file and the star trails image file based on the associated encode or stop values 822. For example, only digital image files associated with the value "encode" and not associated with the value "stop" may be provided to the HEVC encoder 806 or the JPEG encoder 808. As a result, the generated star trails video and the generated star trails image may include only imagery that was generated with appropriate conditions and appropriate adaptive acquisition control data for star trails imagery.

As illustrated, the star trials delayed processing component 824 resides within the ISP 804. In alternative implementations, the star trials delayed processing component 824 may reside externally to the ISP 804. In this case, the ISP 804 may communicate with the star trials delayed processing component 824, which, in turn, communicates with the HEVC encoder 806 and the JPEG encoder 808.

As illustrated, the buffers 816 reside within the ISP 804. The buffers 816 may receive the encode or stop value 822 from the adaptive acquisition control data processing component 820 of the ISP. The buffers 804 may receive the digital image files from the SRO 814. The buffers 816 may be accessed by the star trails delayed processing component 824, as described above, with the star trails delayed processing component 824 residing either within or externally to the ISP 804. In alternative implementations, the buffers 816 may reside outside the ISP 804.

Figure 9:
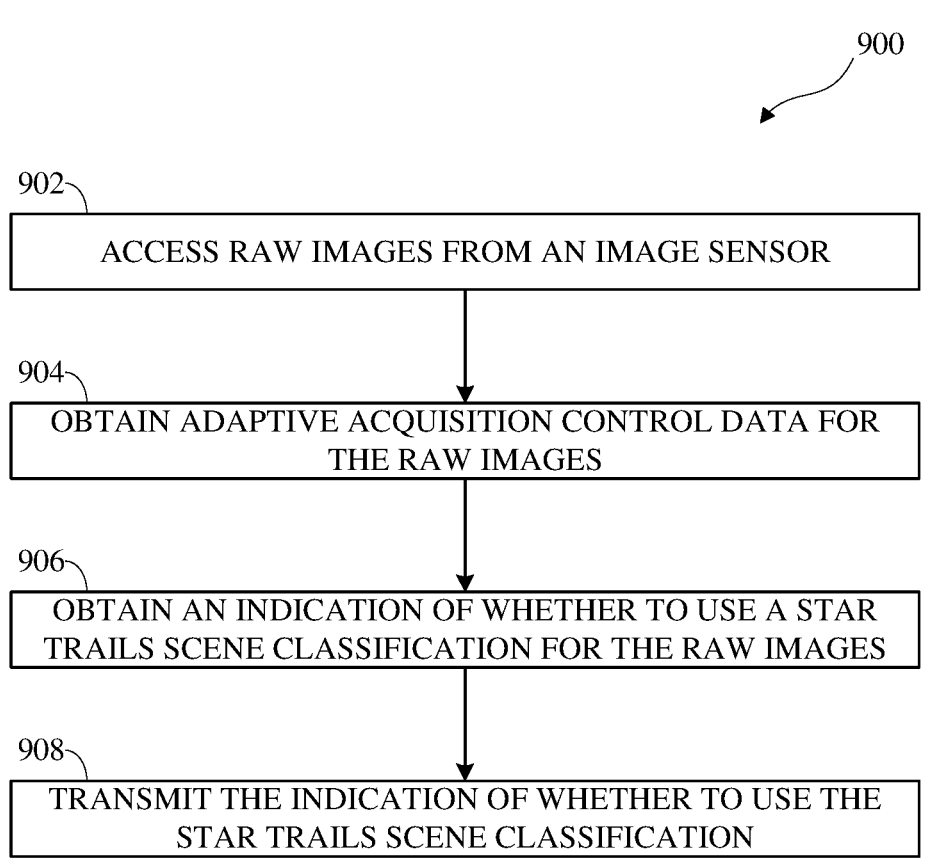
FIG. 9 is a flow chart of a technique for star trails image processing.

FIG. 9 is a flow chart of a technique 900 for star trails image processing. The technique 900 may be implemented at an ISP, for example, the ISP 620, the ISP 700, or the ISP 804.

At block 902, the ISP accesses raw images from an image sensor. The raw images may include an analog electrical signal that represents light intensity and color information of the scene being imaged. The analog electrical signal is generated by the image sensor in response to the light that falls on the surface.

At block 904, the ISP obtains adaptive acquisition control data for the raw images. The adaptive acquisition control data may be obtained by the SEN of the ISP. In some cases, the SEN measures the amount of light that falls on the image sensor and adjusts the camera's exposure settings to achieve (or get within a threshold of) a target luminance level.

At block 906, the ISP obtains, in accordance with the adaptive acquisition control data, an indication of whether to use a star trails image classification for the raw images. In some cases, the ISP obtains image acquisition parameters in accordance with the indication of whether to use the star trails scene classification (e.g., as opposed to the daytime scene classification, as described above). The image acquisition parameters include at least one of an aperture value, an exposure value, or a gain value.

In some cases, to obtain the indication of whether to use a star trails image classification for the raw images, the ISP determines the image luminance value of a processed image corresponding to a raw image. The ISP determines to use the star trails classification if the image luminance value exceeds (or falls below) a threshold. The star trails scene classification may include at least one of a wider aperture, a longer exposure value, or a higher gain relative to a daytime scene classification.

In some cases, the camera that includes the ISP also includes a clock and a global positioning system (GPS) unit. The ISP obtains the indication to use the star trails scene classification in response to a determination that a current time at a geographic location indicated by the GPS is after a sunset time on a given date and before a sunrise time on the date immediately following the given date, when the sun is expected to be below the horizon.

At block 908, the ISP transmits, to buffers for storing data in accordance with the raw images, the indication of whether to use the star trails scene classification. The buffers may reside within the ISP or externally to the ISP.

In some cases, the image signal processor operates in conjunction with an SRO. The SRO converts the raw images to partially processed image data. The partially processed image data is sent to the buffers for storage. The partially processed image data may include RGB images or YUV images. The SRO may reside within the ISP or externally to the ISP.

Some implementations are described below as numbered examples (Example 1, 2, 3, etc.). These examples are provided as examples only and do not limit the other implementations disclosed herein.

Example 1 is a method, comprising: accessing, by an image signal processor, raw images from an image sensor; obtaining, by the image signal processor, adaptive acquisition control data for the raw images, the adaptive acquisition control data comprising at least one of a luminance value, a contrast value, a gain value, an exposure value, or a white balance value; obtaining, in accordance with the adaptive acquisition control data, an indication of whether to use a star trails scene classification for the raw images; and transmitting, by the image signal processor to buffers for storing data in accordance with the raw images, the indication of whether to use the star trails scene classification.

In Example 2, the subject matter of Example 1 includes, obtaining image acquisition parameters in accordance with the indication of whether to use the star trails scene classification, wherein the image acquisition parameters comprise at least one of an aperture value, an exposure value, or a gain value.

In Example 3, the subject matter of Examples 1-2 includes, wherein the image signal processor operates in conjunction with a sensor readout component, the sensor readout component converting the raw images to partially processed image data and sending the partially processed image data to the buffers.

In Example 4, the subject matter of Example 3 includes, wherein the buffers store the partially processed image data, wherein the partially processed image data comprises RGB images or YUV images.

In Example 5, the subject matter of Examples 1~4 includes, wherein obtaining the indication of whether to use the star trails scene classification comprises: determining an image luminance value of a processed image corresponding to a raw image; and determining to use the star trails scene classification if the image luminance value exceeds a threshold.

In Example 6, the subject matter of Examples 1-5 includes, wherein the star trails scene classification comprises at least one of a wider aperture value, a longer exposure value, or a higher gain value relative to a daytime scene classification.

In Example 7, the subject matter of Examples 1-6 includes, wherein obtaining the indication of whether to use the star trails scene classification comprises obtaining the indication to use the star trails scene classification in response to a determination that a current time at a geographic location indicated by a global positioning system is after a sunset time on a given date and before a sunrise time on a date immediately following the given date.

Example 8 is an apparatus, comprising: a storage unit; an image sensor; and an image signal processor to: accessing an electrical signal representing images from the image sensor; obtain adaptive acquisition control data for the images represented by the electrical signal, the adaptive acquisition control data comprising at least one of a luminance value, a contrast value, a gain value, an exposure value, or a white balance value; obtain, in accordance with the adaptive acquisition control data, an indication of whether to use a star trails scene classification for the images; and transmit, to buffers of the image signal processor for storing data in accordance with the images, the indication of whether to use the star trails scene classification.

In Example 9, the subject matter of Example 8 includes, the image signal processor to: obtain image acquisition parameters in accordance with the indication of whether to use the star trails scene classification, wherein the image acquisition parameters comprise at least one of an aperture value, an exposure value, or a gain value.

In Example 10, the subject matter of Examples 8-9 includes, wherein the image signal processor operates in conjunction with a sensor readout component, the sensor readout component converting the electrical signal to partially processed image data and sending the partially processed image data to the buffers.

In Example 11, the subject matter of Example 10 includes, wherein the buffers store the partially processed image data, wherein the partially processed image data comprises RGB images or YUV images.

In Example 12, the subject matter of Examples 8-11 includes, wherein, to obtain the indication of whether to use the star trails scene classification, the image signal processor is to: determine an image luminance value of a processed image corresponding to the electrical signal; and determine to use the star trails scene classification if the image luminance value exceeds a threshold.

In Example 13, the subject matter of Examples 8-12 includes, wherein the star trails scene classification comprises at least one of a wider aperture value, a longer exposure value, or a higher gain value relative to a daytime scene classification.

In Example 14, the subject matter of Examples 8-13 includes, wherein, to obtain the indication of whether to use the star trails scene classification, the image signal processor is to obtain the indication to use the star trails scene classification in response to a determination that a current time at a geographic location indicated by a global positioning system is after a sunset time on a given date and before a sunrise time on a date immediately following the given date.

Example 15 is a non-transitory machine-readable medium storing instructions that, when executed by an image signal processor, cause the image signal processor to: access raw images from an image sensor; obtain adaptive acquisition control data for the raw images; obtain, in accordance with the adaptive acquisition control data, an indication of whether to use a star trails scene classification or a daytime scene classification for the raw images; and transmit, to buffers for storing data in accordance with the raw images, the indication of whether to use the star trails scene classification or the daytime scene classification, the buffers receiving at least a portion of the data from a sensor readout component.

In Example 16, the subject matter of Example 15 includes, storing instructions that, when executed by an image signal processor, cause the image signal processor to: obtain image acquisition parameters in accordance with the indication of whether to use the star trails scene classification or the daytime scene classification, wherein the image acquisition parameters comprise at least one of an aperture value, an exposure value, or a gain value.

In Example 17, the subject matter of Examples 15-16 includes, wherein the image signal processor operates in conjunction with a sensor readout component, the sensor readout component converting the raw images to partially processed image data and sending the partially processed image data to the buffers.

In Example 18, the subject matter of Example 17 includes, wherein the buffers store the partially processed image data, wherein the partially processed image data comprises RGB images or YUV images.

In Example 19, the subject matter of Examples 15-18 includes, wherein the instructions to obtain the indication of whether to use the star trails scene classification or the daytime scene classification comprise instructions that, when executed by the image signal processor, cause the image signal processor to: determine an image luminance value of a processed image corresponding to a raw image; and determine to use the star trails scene classification if the image luminance value exceeds a threshold; or determine to use the daytime scene classification if the image luminance value does not exceed the threshold.

In Example 20, the subject matter of Examples 15-19 includes, wherein the star trails scene classification comprises at least one of a wider aperture value, a longer exposure value, or a higher gain value relative to the daytime scene classification.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

The methods and techniques of star trails image processing described herein, or aspects thereof, may be implemented by an image capture apparatus, or one or more components thereof, such as the image capture apparatus 100 shown in FIGS. 1A-1B, the image capture apparatus 200 shown in FIGS. 2A-2B, the image capture apparatus 300 shown in FIG. 3, the image capture apparatus 400 shown in FIGS. 4A-4B, or the image capture apparatus 500 shown in FIG. 5. The methods and techniques of star trails image processing described herein, or aspects thereof, may be implemented by an image capture device, such as the image capture device 104 shown in FIGS. 1A-1B, one or more of the image capture devices 204, 206 shown in FIGS. 2A-2B, one or more of the image capture devices 304, 306 shown in FIG. 3, the image capture device 404 shown in FIGS. 4A-4B, or an image capture device of the image capture apparatus 500 shown in FIG. 5. The methods and techniques of star trails image processing described herein, or aspects thereof, may be implemented by an image processing pipeline, or one or more components thereof, such as the image processing pipeline 600 shown in FIG. 6.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
accessing, by an image signal processor, raw images from an image sensor;
obtaining, by the image signal processor, adaptive acquisition control data for the raw images, the adaptive acquisition control data comprising at least one of a luminance value, a contrast value, a gain value, an exposure value, or a white balance value;
obtaining, in accordance with the adaptive acquisition control data, an indication of whether to use a star trails scene classification for the raw images; and
transmitting, by the image signal processor to buffers for storing data in accordance with the raw images, the indication of whether to use the star trails scene classification.

2. The method of claim 1, further comprising:
obtaining image acquisition parameters in accordance with the indication of whether to use the star trails scene classification, wherein the image acquisition parameters comprise at least one of an aperture value, an exposure value, or a gain value.

3. The method of claim 1, wherein the image signal processor operates in conjunction with a sensor readout component, the sensor readout component converting the raw images to partially processed image data and sending the partially processed image data to the buffers.

4. The method of claim 3, wherein the buffers store the partially processed image data, wherein the partially processed image data comprises RGB images or YUV images.

5. The method of claim 1, wherein obtaining the indication of whether to use the star trails scene classification comprises:
determining an image luminance value of a processed image corresponding to a raw image; and
determining to use the star trails scene classification if the image luminance value exceeds a threshold.

6. The method of claim 1, wherein the star trails scene classification comprises at least one of a wider aperture value, a longer exposure value, or a higher gain value relative to a daytime scene classification.

7. The method of claim 1, wherein obtaining the indication of whether to use the star trails scene classification comprises obtaining the indication to use the star trails scene classification in response to a determination that a current time at a geographic location indicated by a global positioning system is after a sunset time on a given date and before a sunrise time on a date immediately following the given date.

8. An apparatus, comprising:
a storage unit;
an image sensor; and
an image signal processor to:
access an electrical signal representing images from the image sensor;
obtain adaptive acquisition control data for the images represented by the electrical signal, the adaptive acquisition control data comprising at least one of a luminance value, a contrast value, a gain value, an exposure value, or a white balance value;
obtain, in accordance with the adaptive acquisition control data, an indication of whether to use a star trails scene classification for the images; and
transmit, to buffers of the image signal processor for storing data in accordance with the images, the indication of whether to use the star trails scene classification.

9. The apparatus of claim 8, the image signal processor to:
obtain image acquisition parameters in accordance with the indication of whether to use the star trails scene classification, wherein the image acquisition parameters comprise at least one of an aperture value, an exposure value, or a gain value.

10. The apparatus of claim 8, wherein the image signal processor operates in conjunction with a sensor readout component, the sensor readout component converting the electrical signal to partially processed image data and sending the partially processed image data to the buffers.

11. The apparatus of claim 10, wherein the buffers store the partially processed image data, wherein the partially processed image data comprises RGB images or YUV images.

12. The apparatus of claim 8, wherein, to obtain the indication of whether to use the star trails scene classification, the image signal processor is to:
determine an image luminance value of a processed image corresponding to the electrical signal; and
determine to use the star trails scene classification if the image luminance value exceeds a threshold.

13. The apparatus of claim 8, wherein the star trails scene classification comprises at least one of a wider aperture value, a longer exposure value, or a higher gain value relative to a daytime scene classification.

14. The apparatus of claim 8, wherein, to obtain the indication of whether to use the star trails scene classification, the image signal processor is to obtain the indication to use the star trails scene classification in response to a determination that a current time at a geographic location indicated by a global positioning system is after a sunset time on a given date and before a sunrise time on a date immediately following the given date.

15. A non-transitory machine-readable medium storing instructions that, when executed by an image signal processor, cause the image signal processor to:
access raw images from an image sensor;
obtain adaptive acquisition control data for the raw images;
obtain, in accordance with the adaptive acquisition control data, an indication of whether to use a star trails scene classification or a daytime scene classification for the raw images; and
transmit, to buffers for storing data in accordance with the raw images, the indication of whether to use the star trails scene classification or the daytime scene classification, the buffers receiving at least a portion of the data from a sensor readout component.

16. The machine-readable medium of claim 15, storing instructions that, when executed by an image signal processor, cause the image signal processor to:
obtain image acquisition parameters in accordance with the indication of whether to use the star trails scene classification or the daytime scene classification, wherein the image acquisition parameters comprise at least one of an aperture value, an exposure value, or a gain value.

17. The machine-readable medium of claim 15, wherein the image signal processor operates in conjunction with a sensor readout component, the sensor readout component converting the raw images to partially processed image data and sending the partially processed image data to the buffers.

18. The machine-readable medium of claim 17, wherein the buffers store the partially processed image data, wherein the partially processed image data comprises RGB images or YUV images.

19. The machine-readable medium of claim 15, wherein the instructions to obtain the indication of whether to use the star trails scene classification or the daytime scene classification comprise instructions that, when executed by the image signal processor, cause the image signal processor to:
determine an image luminance value of a processed image corresponding to a raw image; and
determine to use the star trails scene classification if the image luminance value exceeds a threshold; or
determine to use the daytime scene classification if the image luminance value does not exceed the threshold.

20. The machine-readable medium of claim 15, wherein the star trails scene classification comprises at least one of a wider aperture value, a longer exposure value, or a higher gain value relative to the daytime scene classification.

\* \* \* \* \*